(12) United States Patent
Koguchi et al.

(10) Patent No.: US 10,267,190 B2
(45) Date of Patent: Apr. 23, 2019

(54) ENGINE OIL SUPPLY APPARATUS

(71) Applicant: MAZDA MOTOR CORPORATION, Hiroshima (JP)

(72) Inventors: Tomohiro Koguchi, Higashihiroshima (JP); Kenta Honda, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 269 days.

(21) Appl. No.: 15/022,803

(22) PCT Filed: Aug. 17, 2015

(86) PCT No.: PCT/JP2015/073026
§ 371 (c)(1),
(2) Date: Mar. 17, 2016

(87) PCT Pub. No.: WO2016/031606
PCT Pub. Date: Mar. 3, 2016

(65) Prior Publication Data
US 2016/0222843 A1    Aug. 4, 2016

(30) Foreign Application Priority Data
Aug. 27, 2014 (JP) ................. 2014-172588

(51) Int. Cl.
*F01M 1/16* (2006.01)
*F01M 1/08* (2006.01)
*F01M 1/02* (2006.01)
*F01M 5/00* (2006.01)
*F01M 11/02* (2006.01)

(52) U.S. Cl.
CPC ............. *F01M 1/16* (2013.01); *F01M 1/02* (2013.01); *F01M 1/08* (2013.01); *F01M 5/002* (2013.01);
(Continued)

(58) Field of Classification Search
CPC .......... F01M 1/16; F01M 11/02; F01M 5/002; F01M 1/02; F01M 1/08; F16N 2280/00
See application file for complete search history.

(56) References Cited

U.S. PATENT DOCUMENTS

2004/0031463 A1    2/2004  Williams et al.
2005/0092283 A1*   5/2005  Eguchi .................... F01N 13/08
                                                 123/196 M
(Continued)

FOREIGN PATENT DOCUMENTS

CN          102705073 A     10/2012
DE    10 2011 114 388 B3    11/2012
(Continued)

OTHER PUBLICATIONS

An Office Action issued by the German Patent Office on Jun. 2, 2017, which corresponds to German Patent Application No. 11 2015 000 171.9 and is related to U.S. Appl. No. 15/022,803; with English language translation.
(Continued)

*Primary Examiner* — Jacob Amick
*Assistant Examiner* — Charles Brauch
(74) *Attorney, Agent, or Firm* — Studebaker & Brackett PC

(57) ABSTRACT

An engine oil supply apparatus includes: an oil pump; an oil supply path which supplies oil to a hydraulic operating section of an engine; an oil cooler which is provided on the oil supply path and which cools oil discharged from the oil pump; and a control apparatus which sets a required oil pressure required from the hydraulic operating section in accordance with an operation state of the engine, as a target oil pressure, and controls the discharge amount of the oil pump so that an oil pressure inside the oil supply path equals the target oil pressure. The control apparatus controls the oil pump so that, during an operation state of the engine where
(Continued)

the oil enters a prescribed high oil temperature state, the oil is discharged in an amount exceeding a discharge amount corresponding to the required oil pressure of the hydraulic operating section.

4 Claims, 14 Drawing Sheets

(52) U.S. Cl.
CPC ......... *F01M 11/02* (2013.01); *F16N 2280/00* (2013.01)

(56) References Cited

U.S. PATENT DOCUMENTS

| | | | |
|---|---|---|---|
| 2009/0261761 A1* | 10/2009 | Yoshioka | B60L 3/003 318/139 |
| 2013/0139768 A1* | 6/2013 | Takemoto | F01M 1/08 123/41.02 |
| 2015/0300218 A1 | 10/2015 | Taguchi | |

FOREIGN PATENT DOCUMENTS

| | | |
|---|---|---|
| JP | 2007051454 A * | 3/2007 |
| JP | 2011-236754 A | 11/2011 |
| JP | 2013-142297 A | 7/2013 |
| WO | 2014/073444 A1 | 5/2014 |

OTHER PUBLICATIONS

International Search Report—PCT/JP2015/073026 dated Nov. 10, 2015.

An Office Action mailed by the State Intellectual Property Office of the People's Republic of China dated Aug. 28, 2018, which corresponds to Chinese Patent Application No. 201580001936.9 and is related to U.S. Appl. No. 15/022,803.

* cited by examiner

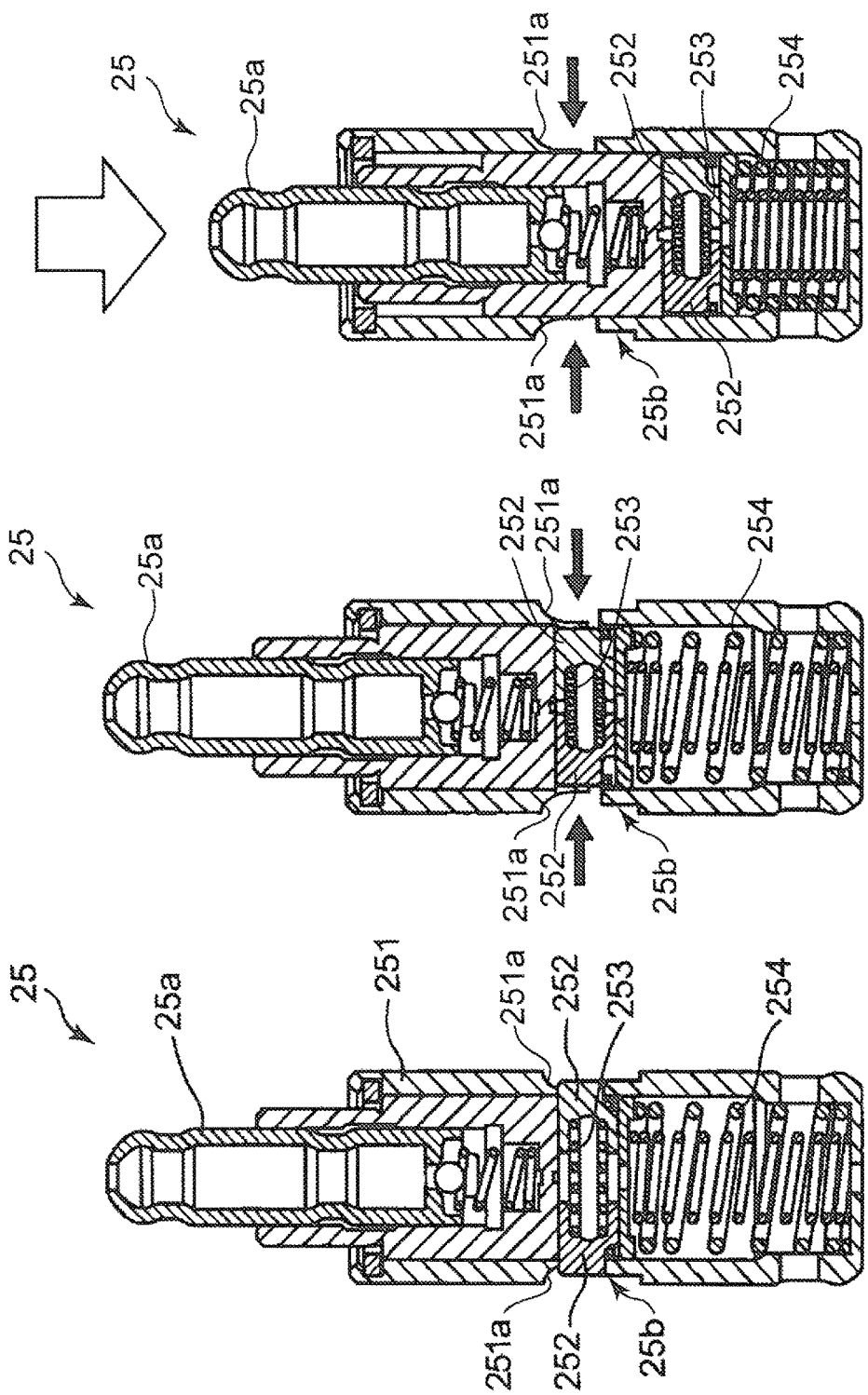

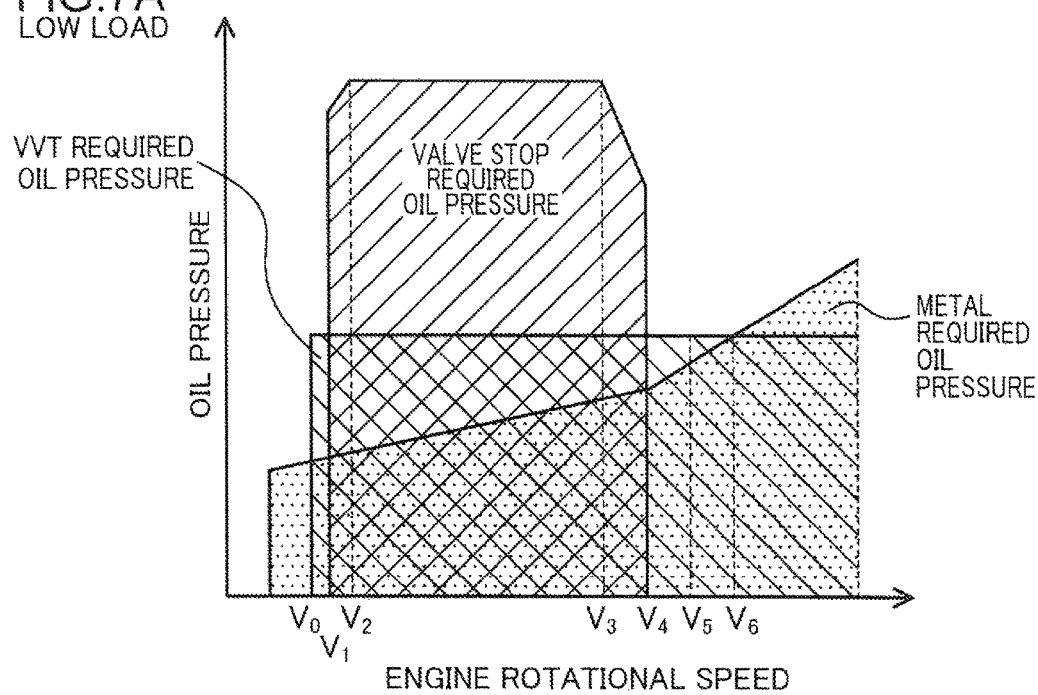
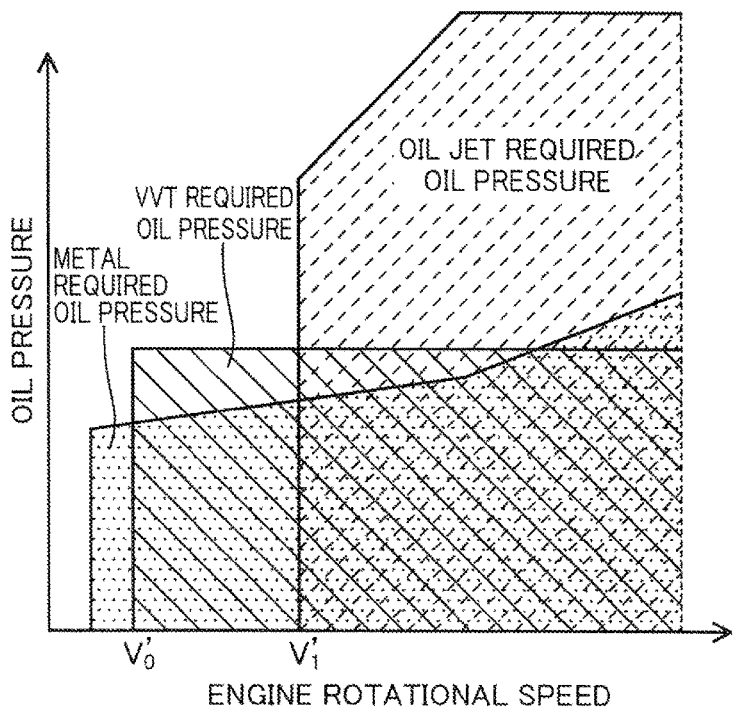

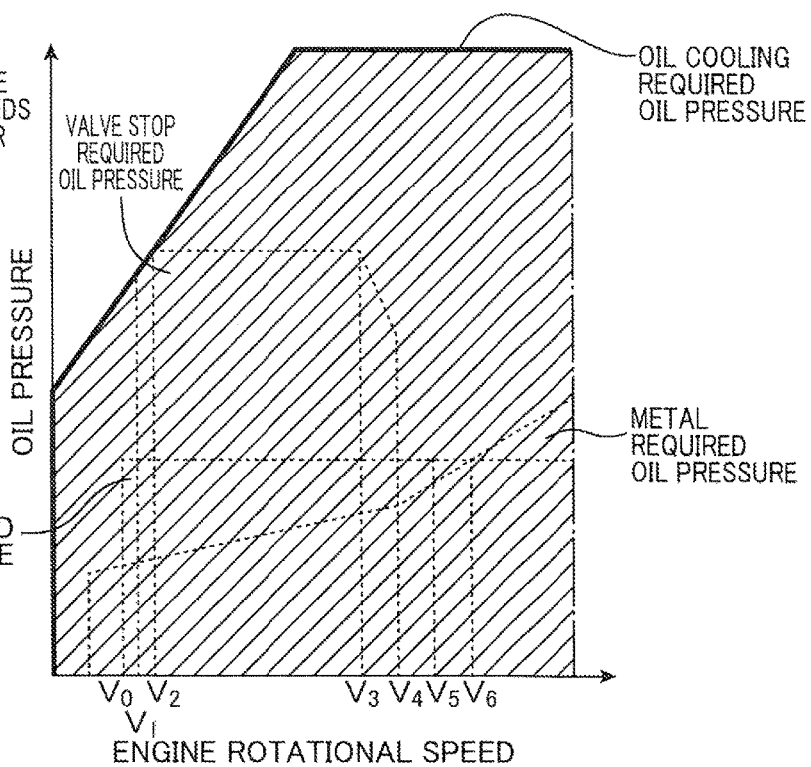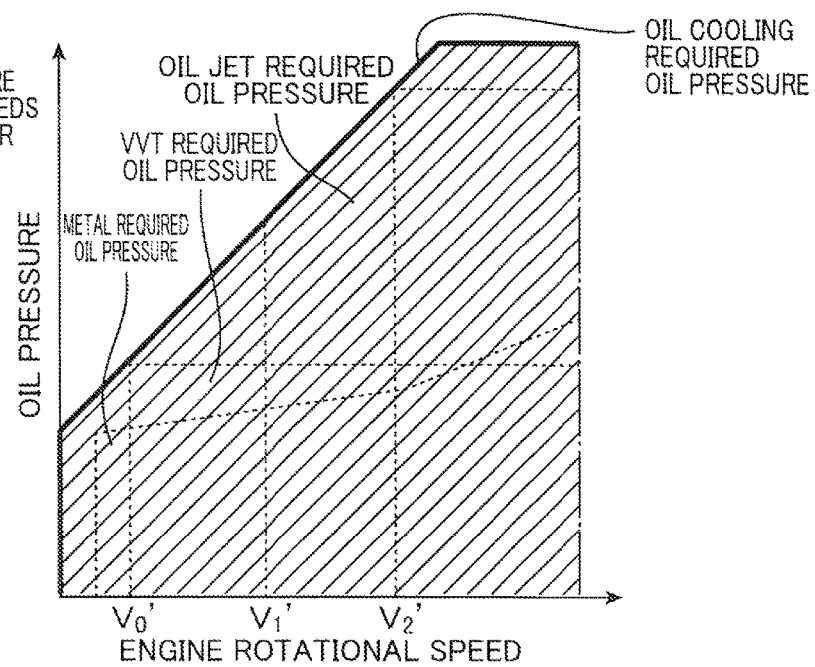

COLD PERIOD

WARM PERIOD

HIGH TEMPERATURE
(LOWER THAN REFERENCE
UPPER LIMIT TEMPERATURE)

HIGH TEMPERATURE
(EQUAL TO OR HIGHER THAN REFERENCE
UPPER LIMIT TEMPERATURE)

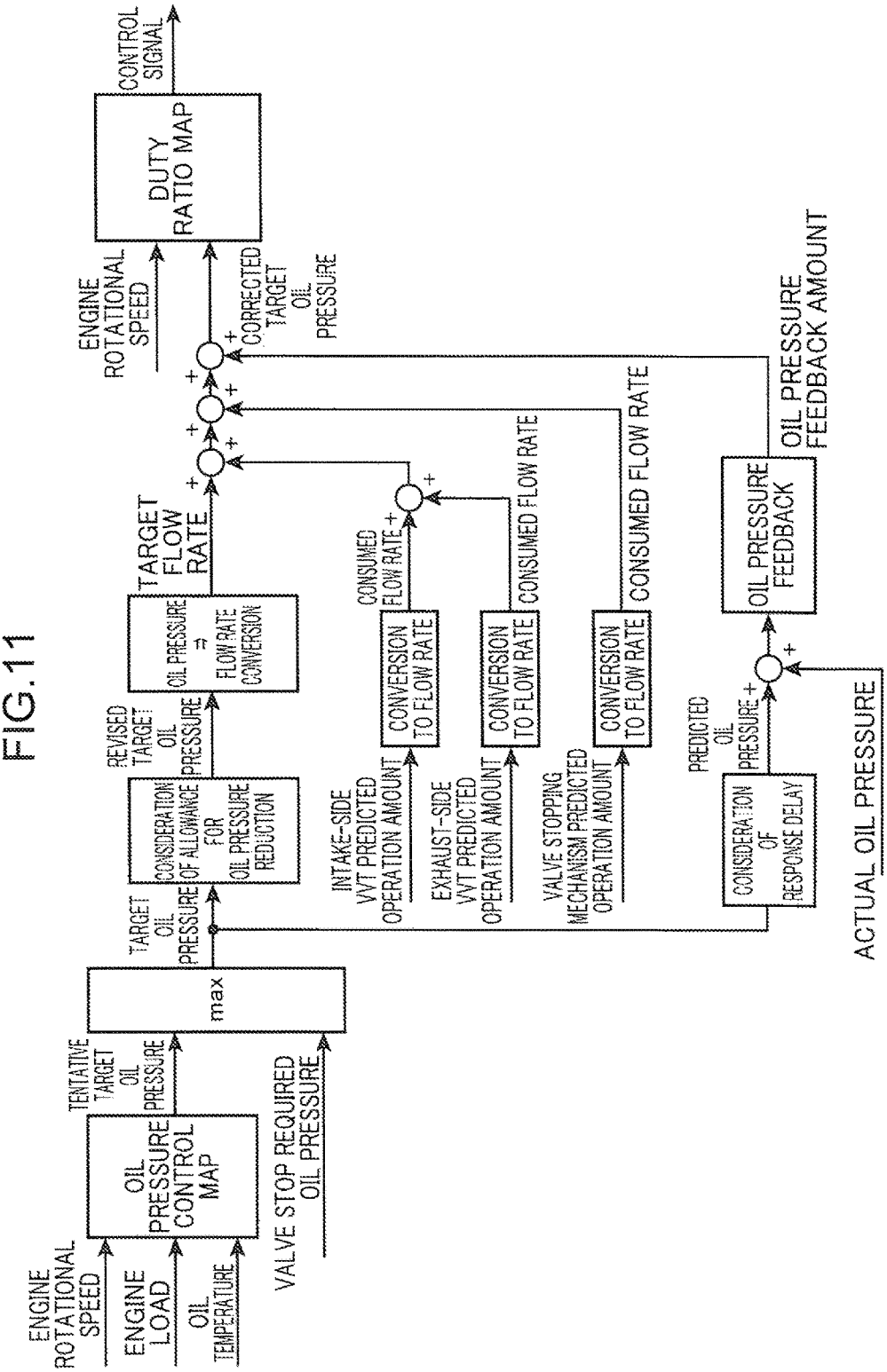

ENGINE OIL SUPPLY APPARATUS

TECHNICAL FIELD

The present invention relates to an engine oil supply apparatus which supplies oil to respective parts of an engine of an automobile or the like.

BACKGROUND ART

Conventionally, oil supply apparatuses are known which supply engine oil (hereinafter, simply referred to as oil) to respective parts of an engine with an oil pump as oil for lubricating bearing sections and sliding sections of the engine, as oil for cooling pistons, or as oil for operating devices which are operated by oil pressure. For example, Patent Literature 1 discloses an oil supply apparatus configured to suppress a temperature rise of a piston or a cylinder by injecting oil to the piston from a jet nozzle during a high-load high-rotation operation of an engine. This oil supply apparatus includes a variable displacement oil pump and is configured to cause oil to be injected from the jet nozzle by controlling an on-off valve and cause a discharge amount of the oil pump to be increased in synchronization with the injection of oil during a high-load high-rotation operation of the engine. In other words, during oil injection from the jet nozzle, an oil discharge amount is increased to maintain overall oil pressure balance in oil supply paths in order to prevent a shortage of oil to be used for other purposes such as lubricating oil.

There is an intimate relationship between oil and fuel efficiency characteristics of an engine, and the lower the viscosity of oil used, the greater the improvement in fuel efficiency. This is because, as well known, oil with lower viscosity is more advantageous in terms of reducing sliding resistance at various parts of the engine.

However, quite a number of oils with relatively low viscosity have relatively low upper-limit operating temperatures. When an engine using such oil is operated at a high rotation and under a high load over an extended period of time, deterioration of the oil due to a rise in temperature (overheating) may conceivably cause galling of a sliding section or the like. Normally, since oil is selected by a user according to his or her preferences, inconveniences such as that described above are desirably prevented in advance in the engine. However, the conventional oil supply apparatus described above is not equipped with such countermeasures.

CITATION LIST

Patent Literature

Patent Literature 1: Japanese Unexamined Patent Publication No. 2013-142297

SUMMARY OF INVENTION

An object of the present invention is to suppress a temperature rise of oil with a rational configuration.

In addition, the present invention provides an engine oil supply apparatus including: an oil pump, the discharge amount of which can be controlled; an oil supply path which supplies oil discharged from the oil pump to a hydraulic operating section of an engine; an oil cooler which is provided on the oil supply path and which cools oil discharged from the oil pump; and a control apparatus which sets a required oil pressure required from the hydraulic operating section in accordance with an operation state of the engine, as a target oil pressure, and controls the discharge amount of the oil pump so that an oil pressure inside the oil supply path equals the target oil pressure, wherein the control apparatus controls the oil pump so that, during an operation state of the engine where the oil enters a prescribed high oil temperature state, the oil is discharged in an amount exceeding a discharge amount corresponding to the required oil pressure of the hydraulic operating section in accordance with the operation state of the engine.

BRIEF DESCRIPTION OF DRAWINGS

FIGS. 2A, 2B and 2C are a sectional view showing a configuration and an operation state of a hydraulic lash adjuster with a valve stopping mechanism, in which FIG. 2A shows a locked state of a pivot mechanism main body, FIG. 2B shows an unlocked state of the pivot mechanism main body, and FIG. 2C shows a state where the pivot mechanism main body has been pressed down from the state shown in FIG. 2C.

FIGS. 7A and 7B are an explanatory diagram of required oil pressure of a hydraulic operating device, in which FIG. 7A is an explanatory diagram of a low-load period and FIG. 7B is an explanatory diagram of a high-load period.

FIGS. 8A and 8B are an explanatory diagram of required oil pressure of an hydraulic operating device, in which FIG. 8A is an explanatory diagram of a low-load period in which oil temperature is equal to or higher than a reference upper limit value and FIG. 8B is an explanatory diagram of a high-load period in which oil temperature is equal to or higher than a reference upper limit value.

FIGS. 9A and 9B show oil pressure control maps representing tentative target oil pressure with respect to an operation state of an engine, in which FIG. 9A is an oil pressure control map during a cold period and FIG. 9B is an oil pressure control map during a warm period.

FIGS. 10A and 10B show oil pressure control maps representing tentative target oil pressure with respect to an operation state of an engine, in which FIG. 10A is an explanatory diagram of a period when temperature is high but lower than a reference upper limit value and FIG. 10B is an explanatory diagram of a period when temperature is high and equal to or higher than the reference upper limit value.

FIG. 11 is a block diagram showing a configuration of discharge amount control of an oil pump by a controller.

DESCRIPTION OF EMBODIMENTS

Hereinafter, a first embodiment of the present invention will be described in detail with reference to the drawings.

<Configuration of Engine>

Figure 1:
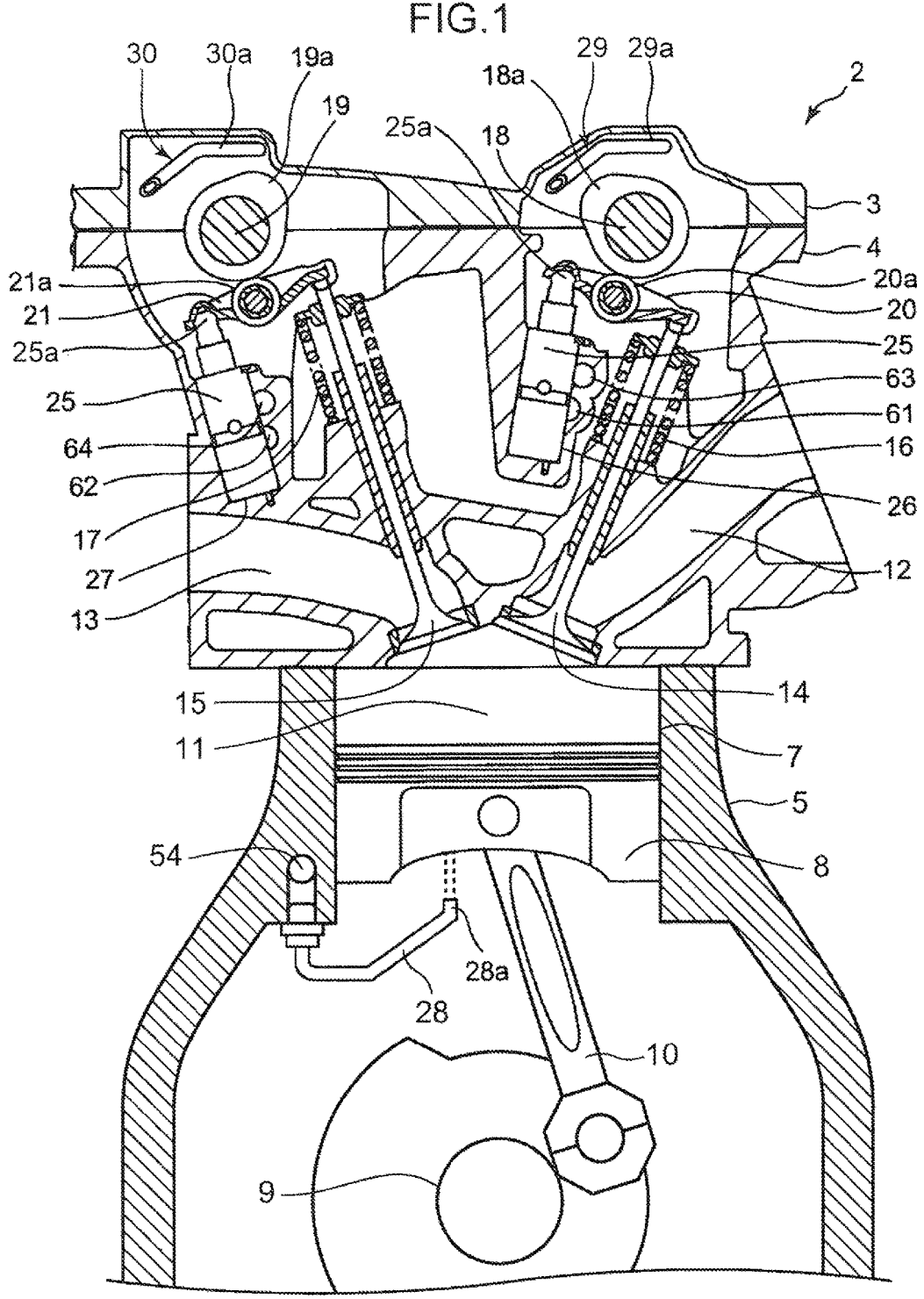
FIG. 1 is a sectional view showing a schematic configuration of a multi-cylinder engine to which an oil supply apparatus according to the present invention is applied (a first embodiment).

FIG. 1 shows a multi-cylinder engine 2 (hereinafter, simply referred to as an engine 2) to which an oil supply apparatus according to the present invention is applied. The engine 2 is an in-line four-cylinder gasoline engine in which first to fourth cylinders are arranged in order in a straight row in a direction perpendicular to a paper plane of FIG. 1 and which is mounted to a vehicle such as an automobile.

Figure 4:
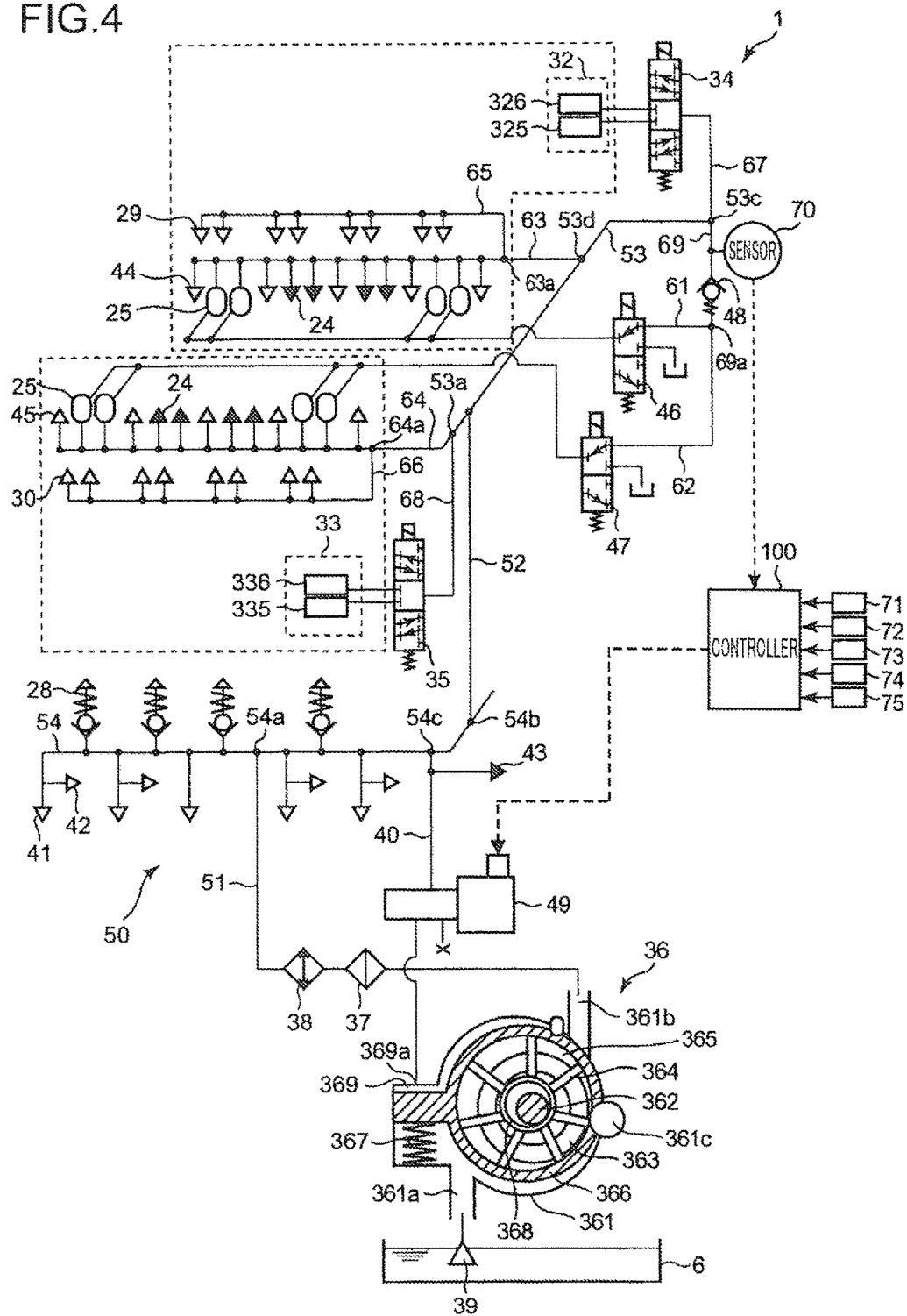
FIG. 4 is a diagram showing a schematic configuration of an oil supply apparatus (the first embodiment).

The engine 2 includes a vertically coupled cam cap 3, a cylinder head 4, a cylinder block 5, a crank case (not shown), and an oil pan 6 (refer to FIG. 4). Four cylinder bores 7 are formed in the cylinder block 5, and a piston 8 is slidably housed in each of the cylinder bores 7. The piston 8, the cylinder bore 7, and the cylinder head 4 form a combustion chamber 11 for each cylinder. Moreover, each piston 8 is coupled via a connecting rod 10 to a crank shaft 9 which is rotatably supported by the crank case.

An intake port 12 and an exhaust port 13 which open to the combustion chamber 11 are provided on the cylinder head 4, and an intake valve 14 and an exhaust valve 15 which respectively open and close the intake port 12 and the exhaust port 13 are respectively mounted to the ports 12 and 13.

The intake valve 14 and the exhaust valve 15 are respectively biased in a direction that closes the respective ports 12 and 13 (an upward direction in FIG. 1) by return springs 16 and 17, and are configured to open the respective ports 12 and 13 by being pressed down by cam sections 18a and 19a provided on outer peripheries of cam shafts 18 and 19. Specifically, with rotation of the cam shafts 18 and 19, the cam sections 18a and 19a press down on cam followers 20a and 21a provided in approximately central portions of swing arms 20 and 21, and the swing arms 20 and 21 swing with vertices of pivot mechanisms of HLAs 24 and 25 (to be described later) provided on one end side of the swing arms 20 and 21 as fulcrums. In accordance with the swinging, other end sections of the swing arms 20 and 21 press down on the intake valve 14 and the exhaust valve 15 against biasing forces of the return springs 16 and 17. As a result, the respective ports 12 and 13 are opened. Moreover, variable valve timing mechanisms 32 and 33 (to be described later) are built into the engine 2 and change opening and closing timings of the intake and exhaust valves 14 and 15 in accordance with an operation state of the engine 2. The variable valve timing mechanisms 32 and 33 will be described later.

Among the first to fourth cylinders of the engine 2, the central second and third cylinders are provided with a hydraulic lash adjuster 24 as a pivot mechanism to act as a fulcrum of the respective swing arms 20 and 21 (refer to FIG. 4). The hydraulic lash adjuster 24 (hereinafter, referred to as HLA 24) is designed to automatically adjust valve clearance to zero using oil pressure.

On the other hand, among the first to fourth cylinders, the first and fourth cylinders positioned at both ends in a cylinder array direction are provided with a hydraulic lash adjuster with a valve stopping mechanism 25 (hereinafter, referred to as HLA with valve stopping mechanism 25 or simply HLA 25) as a pivot mechanism to act as a fulcrum of the respective swing arms 20 and 21. In addition to a function of automatically adjusting valve clearance to zero in a similar manner to the HLA 24, the HLA with valve stopping mechanism 25 is equipped with a function of switching between a state that allows operation and a state that stops operation of the intake valve 14 and the exhaust valve 15. Accordingly, an operation state of the engine 2 can be switched between a full cylinder operation in which the intake and exhaust valves 14 and 15 of all cylinders are operated (opened and closed) and a reduced-cylinder operation in which operations of the intake and exhaust valves 14 and 15 of the first and fourth cylinders among all cylinders are stopped (opening and closing operations are stopped) and only the intake and exhaust valves 14 and 15 of the second and third cylinders are operated.

In the cylinder head 4, portions on an intake side and an exhaust side which correspond to the first and fourth cylinders are provided with mounting holes 26 and 27 to which a lower end section of the HLA with valve stopping mechanism 25 is inserted and mounted. In addition, in the cylinder head 4, portions on an intake side and an exhaust side which correspond to the second and third cylinders are similarly provided with mounting holes 26 and 27 to which a lower end section of the HLA 24 is inserted and mounted. Furthermore, two oil paths 63 and 64 which extend in the cylinder array direction across the first to fourth cylinders and which are respectively communicated with the mounting holes 26 and 27 of the intake-side and exhaust-side HLAs 24 and 25 and two oil paths 61 and 62 which extend in the cylinder array direction at positions corresponding to the first and fourth cylinders and which are respectively communicated with the mounting holes 26 and 27 of the intake-side and exhaust-side HLAs with valve stopping mechanism 25 are formed in the cylinder head 4.

Among the oil paths 61, 62, 63, and 64, the oil paths 63 and 64 are provided in order to supply oil (operating oil) to the HLA 24 and to a pivot mechanism main body 25a (to be described later) of the HLA with valve stopping mechanism 25 which are mounted to the mounting holes 26 and 27, and the HLA 24 and the pivot mechanism main body 25a of the HLA with valve stopping mechanism 25 automatically adjust valve clearance to zero using oil pressure (working pressure) of the oil. On the other hand, the oil paths 61 and 62 are provided in order to supply oil to a valve stopping mechanism 25b (shown in FIGS. 2A to 2C; to be described later) of the HLA with valve stopping mechanism 25 mounted to the mounting holes 26 and 27. Moreover, the oil paths 61, 62, 63, and 64 will be described later in detail.

In the cylinder block 5, a main gallery 54 which extends in the cylinder array direction is provided inside an exhaust-side side wall of the cylinder bore 7. An oil jet 28 for piston cooling which communicates with the main gallery 54 is provided at a position which is in a vicinity of a lower side of the main gallery 54 and which corresponds to each piston 8. The oil jet 28 has a shower nozzle 28a that is positioned on a lower side the piston 8 and is configured to inject oil (cooling oil) toward a rear surface of the piston 8 from the shower nozzle 28a.

In addition, oil supply sections 29 and 30 are provided above the respective cam shafts 18 and 19. The oil supply sections 29 and 30 have nozzles 29a and 30a and are configured so that oil (lubricating oil) drips down from the nozzles 29a and 30a to the cam sections 18a and 19a of the cam shafts 18 and 19 and to contact sections between the swing arms 20 and 21 and the cam followers 20a and 21a which are positioned below the nozzles 29a and 30a.

<Configuration of HLA with Valve Stopping Mechanism 25>

Next, the valve stopping mechanism 25b of the HLA with valve stopping mechanism 25 will be described with reference to FIGS. 2A to 2C. As described above, by switching the intake valve 14 and the exhaust valve 15 between a state that allows operation thereof and a state that stops operation thereof, the valve stopping mechanism 25b switches an operation state of the engine 2 between a full cylinder operation state in which the intake and exhaust valves 14 and 15 of all cylinders are operated (opened and closed) and a reduced-cylinder operation state in which operations of the intake and exhaust valves 14 and 15 of the first and fourth cylinders are stopped (opening and closing operations are stopped) and only the intake and exhaust valves 14 and 15 of the second and third cylinders are operated. In other words, when the engine 2 is under full cylinder operation control, the valve stopping mechanism 25b is stopped and, accordingly, opening and closing operations of the intake and exhaust valves 14 and 15 of all cylinders including the first and fourth cylinders are performed, and when the engine 2 is under reduced-cylinder operation control, the valve stopping mechanism 25b is hydraulically operated and, accordingly, opening and closing operations of the intake and exhaust valves 14 and 15 of the first and fourth cylinders among all cylinders are stopped.

In the present embodiment, as described earlier, the valve stopping mechanism 25b is provided on the HLA with valve stopping mechanism 25. In other words, the HLA with valve stopping mechanism 25 includes the pivot mechanism main body 25a and the valve stopping mechanism 25b. The pivot mechanism main body 25a substantially shares the same configuration as the HLA 24 which automatically adjusts valve clearance to zero using oil pressure.

As shown in FIG. 2A, the valve stopping mechanism 25b includes a bottomed outer cylinder 251 in which the pivot mechanism main body 25a is slidably housed in an axial direction, a pair of lock pins 252 which is provided so as to be capable of entering and exiting two through-holes 251a provided so as to oppose each other on a peripheral side wall of the outer cylinder 251, a lock spring 253 which biases the pair of lock pins 252 outward in a radial direction, and a lost motion spring 254 which is provided between an inner bottom portion of the outer cylinder 251 and a bottom portion of the pivot mechanism main body 25a and which biases the pivot mechanism main body 25a upward. The pair of lock pins 252 is displaceable to a separated position where the lock pins 252 are respectively inserted into the through-holes 251a in a state in which tips of the lock pins 252 protrude outside from the outer cylinder 251 and an approached position where the lock pins 252 are drawn out to the inside of the outer cylinder 251 from the through-holes 251a. In addition, when the pair of lock pins 252 are arranged at the separated position by a biasing force of the lock spring 253 in a state where the pivot mechanism main body 25a protrudes upward from the outer cylinder 251, upward and downward movements of the pivot mechanism main body 25a are restricted (this is referred to as a locked state of the pivot mechanism main body 25a). On the other hand, when the pair of lock pins 252 are arranged at the approached position against a resilient force of the lock spring 253 due to oil pressure supplied through the oil paths 61 and 62, the lock pins 252 are configured to be able to move upward and downward in the outer cylinder 251 together with as the pivot mechanism main body 25a (this is referred to as a lock-released state of the pivot mechanism main body 25a).

In other words, as shown in FIG. 2A, in the locked state of the pivot mechanism main body 25a, a vertex of the pivot mechanism main body 25a protruding from the outer cylinder 251 becomes a fulcrum of swinging of the swing arms 20 and 21. Therefore, when the cam sections 18a and 19a press down the cam followers 20a and 21a due to rotation of the cam shafts 18 and 19, the intake and exhaust valves 14 and 15 are pressed down against biasing forces of the return springs 16 and 17 to open the respective ports 12 and 13. Therefore, by placing the pivot mechanism main body 25a in a locked state with respect to the first and fourth cylinders, a full cylinder operation of the engine 2 can be performed.

On the other hand, as shown in FIG. 2B, when outer-side end surfaces of the pair of lock pins 252 are pressed due to oil pressure, the lock pins 252 approach each other against the resilient force of the lock spring 253 and are drawn out to the inside of the outer cylinder 251 from the through-holes 251a and, accordingly, the pivot mechanism main body 25a positioned above the lock pins 252 can move in an upward and downward direction (an axial direction). In other words, the pivot mechanism main body 25a enters a lock-released state.

When the pivot mechanism main body 25a is placed in the lock-released state in this manner, opening and closing operations of the intake and exhaust valves 14 and 15 are stopped. In other words, the biasing force of the lost motion spring 254 is set smaller than biasing of the return springs 16 and 17 which bias the intake and exhaust valves 14 and 15. As a result, when the cam followers 20a and 21a are pressed down by the cam sections 18a and 19a in the lock-released state of the pivot mechanism main body 25a, the vertices of the intake and exhaust valves 14 and 15 become fulcrums of swinging of the swing arms 20 and 21 and, as shown in FIG. 2C, the pivot mechanism main body 25a is pressed down against the biasing force of the lost motion spring 254. Accordingly, the intake and exhaust valves 14 and 15 are kept in closed states. Therefore, by setting the pivot mechanism main body 25a in a lock-released state with respect to the first and fourth cylinders, a reduced-cylinder operation of the engine 2 can be performed.

<Configuration of Variable Valve Timing Mechanisms 32 and 33>

In the engine 2, the variable valve timing mechanism 32 (hereinafter, referred to as the VVT 32) which changes valve characteristics of the intake valve 14 and the variable valve timing mechanism 33 (hereinafter, referred to as the VVT 33) which changes valve characteristics of the exhaust valve 15 are built into all cylinders.

Figure 3A:
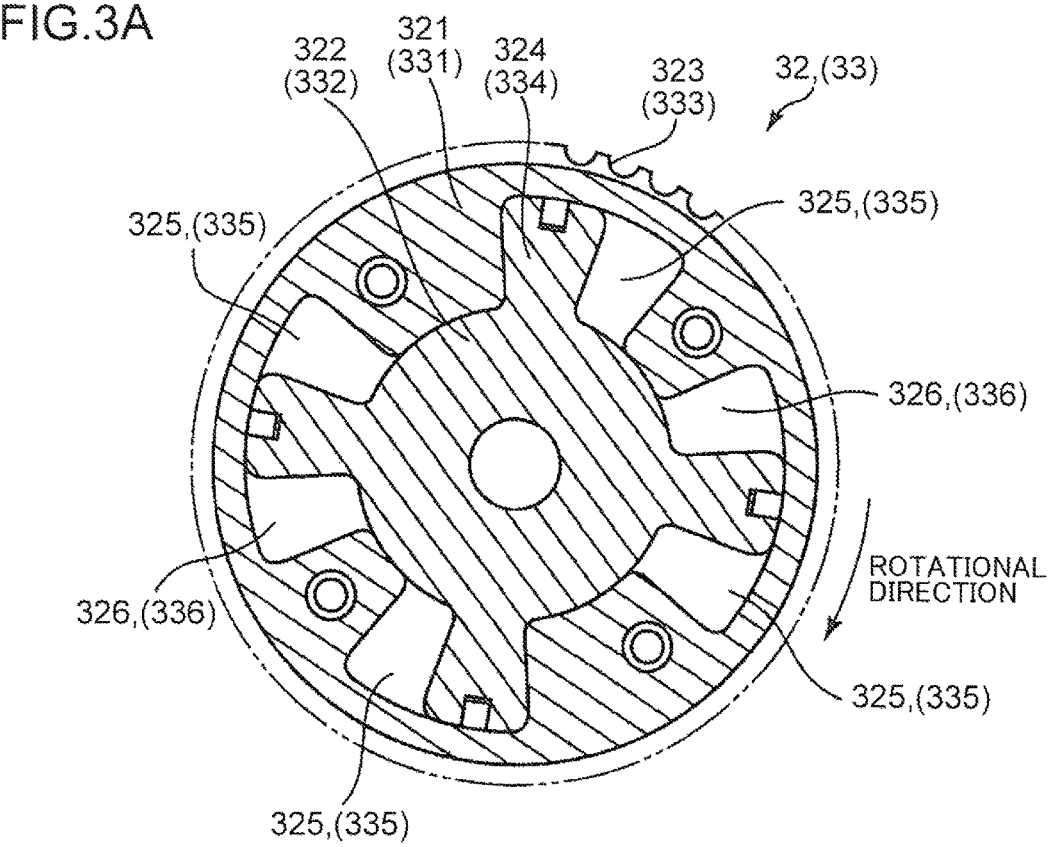
FIG. 3A is a sectional view showing a schematic configuration of a variable valve timing mechanism and FIG. 3B is a graph showing valve characteristics (relationships between phase and lift amount) of an intake valve and an exhaust valve.

FIG. 3A is a sectional view showing a schematic configuration of the VVTs 32 and 33. In the diagram, components of the VVT 33 of the exhaust valve 15 are denoted by parenthesized reference numerals.

As shown in FIG. 3A, the VVT 32 (33) includes an approximately ring-like housing 321 (331) and a rotor 322 (332) housed inside the housing 321 (331). The housing 321 (331) is coupled so as to be integrally rotatable to a cam pulley 323 (333) that rotates in synchronization with the crank shaft 9, and the rotor 322 (332) is coupled so as to be integrally rotatable to a cam shaft 18 (19) that opens and closes the intake valve 14 (the exhaust valve 15). A retarded oil pressure chamber 325 (335) and an advanced oil pressure chamber 326 (336) which are defined by an inner peripheral surface of the housing 321 (331) and vanes 324 (334) provided on the rotor 322 (332) are formed in plurality inside the housing 321 (331). An oil pump 36 (to be described later; refer to FIG. 4) which supplies oil is connected via a first direction switching valve 34 (35) (refer to FIG. 4) to the retarded oil pressure chamber 325 (335) and the advanced oil pressure chamber 326 (336). Due to control of the first direction switching valve 34 (35), when oil is introduced into the retarded oil pressure chamber 325 (335), the cam shaft 18 (19) rotates in an opposite direction to a rotational direction thereof (a direction of an arrow in FIG. 3A) due to oil pressure and, accordingly, an opening timing of the intake valve 14 (the exhaust valve 15) is delayed. On the other hand, when oil is introduced into the advanced oil pressure chamber 326 (336), since the cam shaft 18 (19) rotates in a rotational direction thereof due to oil pressure, an opening timing of the intake valve 14 (the exhaust valve 15) is advanced.

Figure 3B:
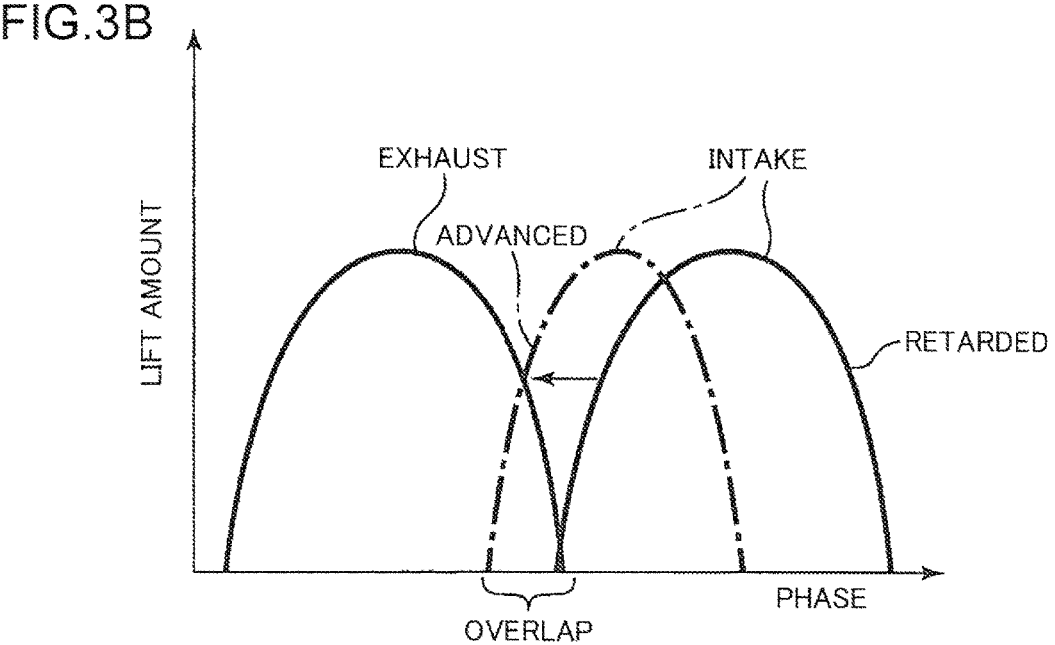

FIG. 3B shows valve opening phases of the intake valve 14 and the exhaust valve 15. As shown in FIG. 3B, when the valve opening phase of the intake valve 14 is changed in an advancing direction (refer to an arrow in FIG. 3B) (and/or the valve opening phase of the exhaust valve 15 is changed in a retarding direction) by the VVT 32 (and/or the VVT 33), a valve opening period of the exhaust valve 15 and a valve opening period of the intake valve 14 (refer to dashed-dotted line) overlap with each other. By causing the valve opening periods of the intake valve 14 and the exhaust valve 15 to overlap with each other in this manner, an internal EGR amount during engine combustion can be increased, and pumping loss can be reduced to improve fuel efficiency performance. In addition, since combustion temperature can be lowered, generation of NOx can be suppressed and exhaust gas can be purified. On the other hand, when the valve opening phase of the intake valve 14 is changed in a retarding direction (and/or the valve opening phase of the exhaust valve 15 is changed in an advancing direction) by the VVT 32 (and/or the VVT 33), an overlap amount of the valve opening period of the intake valve 14 (refer to solid line) and the valve opening period of the exhaust valve 15 decreases. Therefore, during a low-load period when the engine load is equal to or lower than a prescribed value such as during idling, stable combustion characteristics can be secured. In the present embodiment, the valve opening periods of the intake valve 14 and the exhaust valve 15 are arranged to overlap with each other even during a low-load period in order to maximize an amount of valve overlap during a high-load period.

<Description of Oil Supply Apparatus 1>

Next, the oil supply apparatus 1 for supplying oil (operating oil) to respective hydraulic operating sections of the engine 2 will be described in detail with reference to FIG. 4. In this case, "hydraulic operating sections" refer to apparatuses (specifically, the HLAs 24 and 25, the VVTs 32 and 33, and the like) which operate by receiving oil pressure of oil or to oil supply sections (specifically, the oil jet 28, the oil supply sections 29 and 30, and the like) which supply oil using its oil pressure to an object as lubricating oil or cooling oil.

As illustrated, the oil supply apparatus 1 includes the oil pump 36 that is driven by rotation of the crank shaft 9 and an oil supply path 50 which is connected to the oil pump 36 and which guides oil pressurized by the oil pump 36 to a lubricating section and the respective hydraulic operating sections of the engine 2. The oil pump 36 is an auxiliary machine that is driven by the engine 2.

The oil supply path 50 is made up of passages formed in the cylinder head 4, the cylinder block 5, and the like as well as pipes. The oil supply path 50 includes: a first communicating path 51 which extends from the oil pump 36 to a branch point 54a in the cylinder block 5; the main gallery 54 which extends from the branch point 54a in the cylinder array direction in the cylinder block 5; a second communicating path 52 which extends from a branch point 54b on the main gallery 54 to the cylinder head 4; a third communicating path 53 which extends in an engine width direction from an intake side to an exhaust side at a front end section (an end section on a side of the first cylinder) in the cylinder head 4; and a plurality of oil paths (to be described later) which branch and extend from the third communicating path 53.

The oil pump 36 is a known variable displacement oil pump. The oil pump 36 includes: a housing 361 that is made up of a pump body with a C-shaped section which is formed so that one end side is opened and which internally includes a pump housing chamber constituted by a columnar space and a cover member which closes the opening of the pump body; a driving shaft 362 which is rotatably supported by the housing 361, which penetrates an approximately central part of the pump housing chamber, and which is rotationally driven by the crank shaft 9; a pump element that is made up of a rotor 363 which is rotatably housed inside the pump housing chamber and the central part of which is coupled to the driving shaft and vanes 364 which are respectively retractably housed in a plurality of slits that are radially cut and formed in an outer peripheral section of the rotor 363; a cam ring 366 which is eccentrically arranged with respect to a center of rotation of the rotor 363 on an outer peripheral side of the pump element and which defines a plurality of pump chambers 365 that are operating oil chambers together with the rotor 363 and vanes 364 adjacent to each other; a spring 367 that is a biasing member which is housed in the pump body and which constantly biases the cam ring 366 in a direction in which an amount of eccentricity of the cam ring 366 with respect to the center of rotation of the rotor 363 increases; and a pair of ring members 368 which is slidably arranged in both side sections on an inner peripheral side of the rotor 363 and which has a smaller diameter than the rotor 363. The housing 361 includes an inlet 361a which supplies oil to the internal pump chamber 365 and a discharge port 361b which discharges oil from the pump chamber 365. A pressure chamber 369 which is defined by an inner peripheral surface of the housing 361 and an outer peripheral surface of the cam ring 366 is formed inside the housing 361, and the housing 361 is provided with an introduction hole 369a that opens to the pressure chamber 369. In other words, the oil pump 36 is configured such that, when oil is introduced to the pressure chamber 369 from the introduction hole 369a, the cam ring 366 swings with respect to a fulcrum 361c, the rotor 363 becomes relatively eccentric with respect to the cam ring 366, and discharge capacity changes.

An oil strainer 39 which faces the oil pan 6 is connected to the inlet 361a of the oil pump 36. An oil filter 37 and an oil cooler 38 are arranged in order from an upstream side to a downstream side in the first communicating path 51 which is communicated with the discharge port 361b of the oil pump 36. Oil stored in the oil pan 6 is pumped by the oil pump 36 through the oil strainer 39, filtered by the oil filter 37 and cooled by the oil cooler 38, and subsequently introduced to the main gallery 54 in the cylinder block 5. Moreover, the oil cooler 38 is a heat exchanger which cools oil due to a heat exchange between engine cooling water and oil.

An oil path 40 which branches from a branch point 54c on the main gallery 54 and which introduces oil to the pressure chamber 369 of the oil pump 36 is connected to the oil pump 36. A linear solenoid valve 49 is provided in the oil path 40. A discharge amount of the oil pump 36 changes as a flow rate of oil introduced to the pressure chamber 369 is adjusted by the linear solenoid valve 49 in accordance with an operation state of the engine 2. Moreover, a flow rate control valve of the oil path 40 is not limited to the linear solenoid valve 49 and may alternatively be, for example, an electromagnetic control valve.

The main gallery 54 is connected to the oil jet 28 for injecting cooling oil to rear surface sides of the four pistons 8, an oil supply section 41 of a metal bearing which is arranged at five main journals that rotatably support the crank shaft 9, and an oil supply section 42 of a metal bearing which rotatably supports four connecting rods and which is arranged at crank pins of the crank shaft 9. Oil is constantly supplied to the main gallery 54.

An oil supply section 43 which supplies oil to a hydraulic chain tensioner and the oil path 40 are connected to a downstream side of the branch point 54c on the main gallery 54.

An oil path 68 that branches from the branch point 53a of the third communicating path 53 is connected via an exhaust-side first direction switching valve 35 to the advanced hydraulic pressure chamber 336 and the retarded hydraulic pressure chamber 335 of the exhaust-side VVT 33 for changing opening and closing timings of the exhaust valve 15 and is configured such that oil is supplied by controlling the first direction switching valve 35. In addition, an oil path 64 that branches from the branch point 53a is connected to an oil supply section 45 (refer to outlined triangle Δ in FIG. 4) of a metal bearing that is arranged on a cam journal of the cam shaft 19, the HLA 24 (refer to black triangle ▲ in FIG. 4), and the HLA with valve stopping mechanism 25 (refer to outlined oval in FIG. 4) of the exhaust side. Oil is constantly supplied to the oil path 64. Furthermore, an oil path 66 that branches from a branch point 64a of the oil path 64 is connected to the oil supply section 30 which supplies lubricating oil to the exhaust-side swing arm 21. Oil is also constantly supplied to the oil path 66.

The intake side is similar to the exhaust side, and an oil path 67 that branches from the branch point 53c of the third communicating path 53 is connected via an intake-side first direction switching valve 34 to the advanced oil pressure chamber 326 and the retarded oil pressure chamber 325 of the VVT 32 for changing opening and closing timings of the intake valve 14. In addition, an oil path 63 that branches from the branch point 53d is connected to an oil supply section 44 (refer to outlined triangle Δ in FIG. 4) of a metal bearing that is arranged on a cam journal of the cam shaft 18, the HLA 24 (refer to black triangle ▲ in FIG. 4), and the HLA with valve stopping mechanism 25 (refer to outlined oval in FIG. 4) of the intake side. Furthermore, an oil path 65 that branches from a branch point 63a of the oil path 63 is connected to the oil supply section 29 which supplies lubricating oil to the intake-side swing arm 20.

In addition, an oil path 69 that branches from the branch point 53c of the third communicating path 53 is provided with a check valve 48 which restricts a flow direction of oil to only one direction from an upstream side to a downstream side and an oil pressure sensor 70 which is positioned between the check valve 48 and the branch point 53c and which detects oil pressure in the oil supply path 50 (on an upstream side of the check valve 48 on the oil path 69).

The oil path 69 branches at a branch point 69a on a downstream side of the check valve 48 into the two oil paths 61 and 62 which are communicated with the mounting holes 26 and 27 for the HLA with valve stopping mechanism 25. The oil path 61 is respectively communicated via an intake-side second direction switching valve 46 with the valve stopping mechanism 25b of the intake-side HLA with valve stopping mechanism 25, and the oil path 62 is communicated via an exhaust-side second direction switching valve 47 with the valve stopping mechanism 25b of the exhaust-side HLA with valve stopping mechanism 25. A configuration is adopted in which oil is supplied to the respective valve stopping mechanisms 25b by controlling the second direction switching valves 46.

The check valve 48 is biased by a spring so as to open when oil pressure in the third communicating path 53 equals or exceeds required oil pressure of the valve stopping mechanism 25b and restricts oil flow to only one direction from an upstream side to a downstream side. In addition, the check valve 48 opens under oil pressure exceeding required oil pressure of the VVTs 32 and 33. While oil pressure of the third communicating path 53 (as well as oil pressure detected by the oil pressure sensor 70) may possibly drop if the VVTs 32 and 33 are operated during a reduced-cylinder operation in which the valve stopping mechanism 25b is operated, since a flow of oil from the valve stopping mechanism 25b to the third communicating path 53 that is located on an upstream side of the check valve 48 provided in the oil path 69 is blocked by the check valve 48, required oil pressure at the valve stopping mechanism 25b on a downstream side of the check valve 48 is secured. However, in the present embodiment, since an oil discharge amount of the oil pump 36 is controlled so that the oil pressure of the third communicating path 53 does not drop based on the detected oil pressure of the oil pressure sensor 70 even if the VVTs 32 and 33 are operated during a reduced-cylinder operation, the check valve 48 may be omitted.

Lubricating oil and cooling oil which are supplied to the crank shaft 9, the metal bearings that rotatably support the cam shafts 18 and 19, the pistons 8, the cam shafts 18 and 19, and the like drip down to the oil pan 6 through a drain oil path (not shown) after cooling or lubrication is completed and are once again recirculated by the oil pump 36.

Operations of the engine 2 described above are controlled by the controller 100. Detection information from various sensors that detect operation states of the engine 2 is input to the controller 100. For example, the controller 100 detects a rotation angle of the crank shaft 9 with a crank angle sensor 71 and detects an engine rotational speed based on the detection signal. In addition, an amount of air sucked by the engine 2 is detected with an air flow sensor 72 and engine load is detected based on the amount of air. Furthermore, temperature and pressure of oil in the oil supply path 50 are respectively detected by an oil temperature sensor 73 and the oil pressure sensor 70. The oil temperature sensor 73 is provided in the oil pressure passage (in the present embodiment, the main gallery 54). Alternatively, an integrated oil pressure/oil temperature sensor having functions of an oil temperature sensor and an oil pressure sensor may be provided in the main gallery 54. Furthermore, a cam angle sensor 74 provided in a vicinity of the cam shafts 18 and 19 is used to detect rotation phases of the cam shaft 18 and 19, in which case an operating angle of the VVTs 32 and 33 is detected based on the cam angle. In addition, temperature of cooling water (hereinafter, referred to as water temperature) for cooling the engine 2 is detected by a water temperature sensor 75.

The controller 100 is a known microcomputer-based control apparatus and includes a signal input section to which detection signals from the respective sensors (the oil pressure sensor 70, the crank angle sensor 71, the air flow sensor 72, the oil temperature sensor 73, the cam angle sensor 74, the water temperature sensor 75, and the like) are input; an arithmetic section which performs arithmetic processes related to control; a signal output section which outputs a control signal to an apparatus that is a control object (the first direction switching valves 34 and 35, the second direction switching valves 46 and 47, the linear solenoid valve 49, and the like); and a storage section which stores programs and data (such as oil pressure control maps and duty ratio maps to be described later) which are necessary for control.

Figure 5:
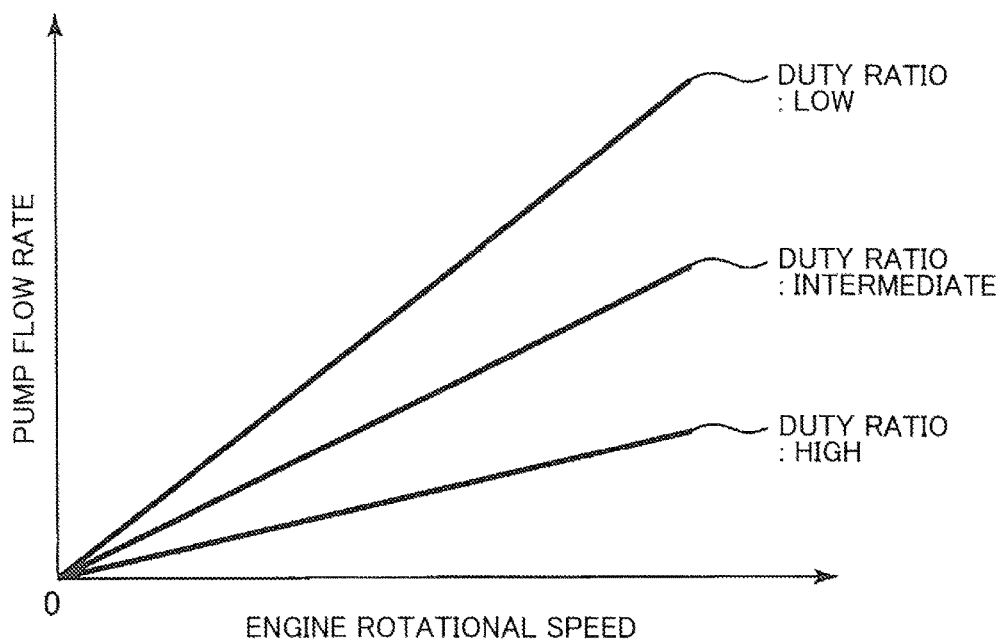
FIG. 5 is a diagram showing characteristics of a variable displacement oil pump.

The controller 100 transmits a control signal of a duty ratio set as will be described later to the linear solenoid valve 49 and controls oil pressure supplied to the pressure chamber 369 of the oil pump 36 via the linear solenoid valve 49. By controlling an amount of eccentricity of the cam ring 366 with the oil pressure of the pressure chamber 369 to control an amount of change of an interior capacity of the pump chamber 365, a flow rate (a discharge amount) of the oil pump 36 is controlled. In other words, the capacity of the oil pump 36 is controlled by the duty ratio. In this case, since the pump 36 is driven by the crank shaft 9 of the engine 2, as shown in FIG. 5, the flow rate (a discharge amount) of the pump 36 is proportional to engine rotational speed. When a duty ratio represents a proportion of time of energization to the linear solenoid valve with respect to time of one cycle, as illustrated, the larger (the higher) the duty ratio, the higher the oil pressure to the pressure chamber 369 of the pump 36 and, accordingly, the smaller the gradient of the flow rate of the pump 36 with respect to engine rotational speed.

As described above, the controller 100 changes a capacity of the oil pump 36 to control a discharge amount of the oil pump 36.

Next, a reduced-cylinder operation of the engine 2 will be described with reference to FIGS. 6A and 6B.

Operations of the engine 2 are switched between a reduced-cylinder operation and a full cylinder operation in accordance with an operation state of the engine 2. Specifically, a reduced-cylinder operation is executed when the operation state of the engine 2 as discerned based on the engine rotational speed, the engine load, and the water temperature of the engine 2 is in an illustrated reduced-cylinder operation range. In addition, as shown, a reduced-cylinder operation preparation range is provided adjacent to the reduced-cylinder operation range. When the operation state of the engine is in the reduced-cylinder operation preparation range, oil pressure is boosted in advance toward required oil pressure of the valve stopping mechanism 25b in preparation of executing a reduced-cylinder operation. Furthermore, when the operation state of the engine 2 is outside of the reduced-cylinder operation range and the reduced-cylinder operation preparation range, a full cylinder operation is executed.

Figure 6A:
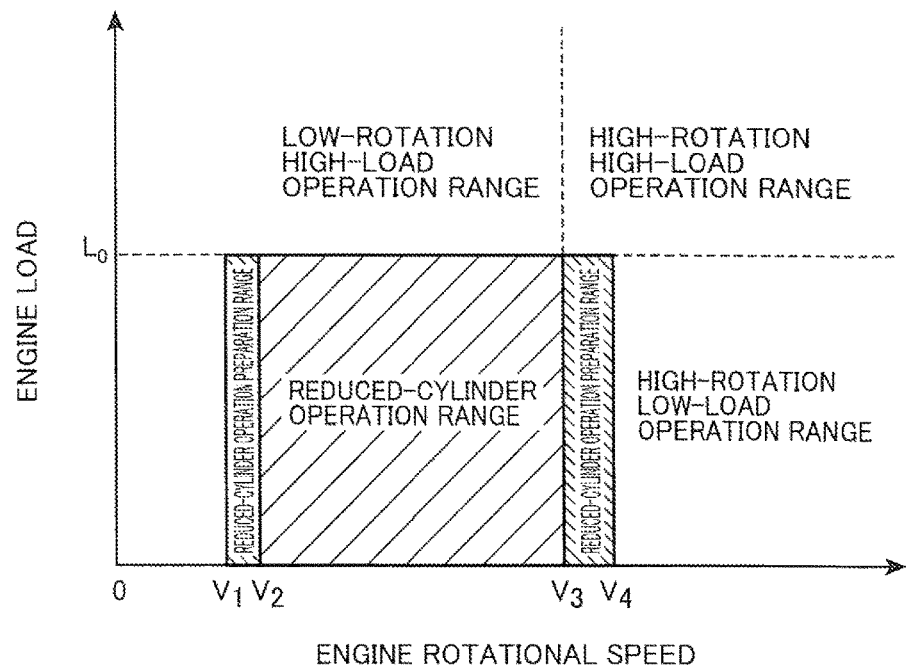
FIG. 6A is a diagram showing a relationship among a reduced-cylinder operation range of an engine, engine load, and engine revolution.

With reference to FIG. 6A, when acceleration is performed under a prescribed engine load (equal to or lower than L0) and the engine rotational speed increases, a full cylinder operation is performed when the engine rotational speed is lower than a prescribed rotational speed V1, preparation for a reduced-cylinder operation is started when the engine rotational speed becomes equal to or higher than V1 and lower than V2 (>V1), and a reduced-cylinder operation is performed when engine rotational speed becomes equal to or higher than V2. In addition, for example, when deceleration is performed under a prescribed engine load (equal to or lower than L0) and the engine rotational speed decreases, a full cylinder operation is performed when the engine rotational speed is equal to or higher than V4, preparation for a reduced-cylinder operation is performed when the engine rotational speed becomes equal to or higher than V3 (<V4) and lower than V4, and a reduced-cylinder operation is performed when engine rotational speed becomes equal to or lower than V3.

Figure 6B:
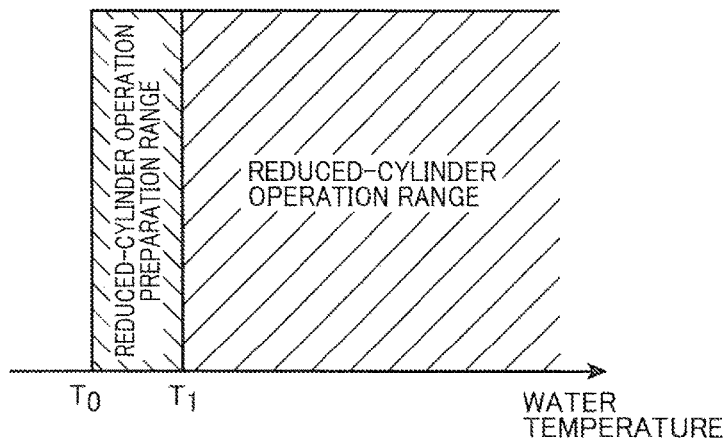
FIG. 6B is a diagram showing a relationship between a reduced-cylinder operation range of an engine and water temperature.

In addition, with reference to FIG. 6B, when traveling at a prescribed engine rotational speed (equal to or higher than V2 and equal to or lower than V3) and under a prescribed engine load (equal to or lower than L0) and the engine 2 is warmed up and the water temperature rises, a full cylinder operation is performed when the water temperature is lower than T0, preparation of a reduced-cylinder operation is performed when the water temperature becomes equal to or higher than T0 and lower than T1, and a reduced-cylinder operation is performed when the water temperature becomes equal to or higher than T1.

Hereinafter, control of the oil pump 36 and the like by the controller 100 will be described.

The oil supply apparatus 1 supplies oil to a plurality of hydraulic operating sections (the HLAs 24 and 25, the VVTs 32 and 33, the oil jet 28, the oil supply sections 44 and 45 of the metal bearings of the journals and the like of the crank shaft 9, and the like) using one oil pump 36. Required oil pressure necessary for the respective hydraulic operating sections changes in accordance with an operation state of the engine 2. Therefore, for all hydraulic operating sections to obtain necessary oil pressure in all operation states of the engine 2, it is rational to set, for each operation state of the engine 2, oil pressure equal to or higher than highest required oil pressure of the required oil pressure of the respective hydraulic operating sections as a target oil pressure in accordance with the operation state of the engine 2. To this end, target oil pressure may be set so as to satisfy required oil pressure of the HLA with valve stopping mechanism 25 (the valve stopping mechanism 25b), the oil jet 28, the oil supply sections 41 and 42 of the metal bearings of the journals and the like of the crank shaft 9, and the VVTs 32 and 33 whose required oil pressure is relatively high among all hydraulic operating sections. This is because target oil pressure set in this manner naturally satisfies required oil pressure of other hydraulic operating sections with relatively low required oil pressure.

FIGS. 7A and 7B show a relationship between engine revolution and required oil pressure of hydraulic operating sections, in which FIG. 7A mainly shows a relationship during low-load operation and FIG. 7B mainly shows a relationship during high-load operation.

With reference to FIG. 7A, during a low-load operation of the engine 2, hydraulic operating sections with relatively high required oil pressure are the VVTs 32 and 33, the oil supply sections 41 and 42 of the metal bearings of the journals and the like of the crank shaft 9, and the valve stopping mechanism 25b of the HLA with valve stopping mechanism 25.

The required oil pressure of the respective hydraulic operating sections changes in accordance with an operation state of the engine 2. For example, the required oil pressure of the VVTs 32 and 33 (described as "VVT required oil pressure" in FIGS. 7A and 7B) is approximately constant when engine rotational speed is equal to or higher than V0 (<V1). The required oil pressure of oil supply sections 41 and 42 of the metal bearings (described as "metal required oil pressure" in FIGS. 7A and 7B) increases as the engine rotational speed increases. The required oil pressure of the valve stopping mechanism 25b (described as "valve stop required oil pressure" in FIG. 7A) is approximately constant when engine rotational speed is within a prescribed range (V2 to V3). In addition, comparing magnitudes of the required oil pressure for each engine rotational speed reveals that there is only the metal required oil pressure when the engine rotational speed is lower than V0, the highest required oil pressure is the VVT required oil pressure when the engine rotational speed is between V0 and V1, the valve stop required oil pressure is the highest required oil pressure when the engine rotational speed is between V1 and V4, the VVT required oil pressure is the highest required oil pressure when the engine rotational speed is between V4 and V6, and the metal required oil pressure becomes the highest required oil pressure when the engine rotational speed equals or exceeds V6. Therefore, the highest required oil pressure described above must be set as the target oil pressure of the oil pump 36 for each engine revolution.

On the other hand, during a high-load operation of the engine 2, as shown in FIG. 7B, the hydraulic operating sections with relatively high required oil pressure are the VVTs 32 and 33, the oil supply sections 41 and 42 of the metal bearings, and the oil jet 28. The required oil pressure of the respective hydraulic operating sections changes in accordance with an operation state of the engine 2 in a similar manner to a low-load operation. For example, the VVT required oil pressure is approximately constant when the engine rotational speed is equal to or higher than V0', and the metal required oil pressure increases as the engine rotational speed increases. In addition, the required oil pressure of the oil jet 28 is 0 when the engine rotational speed is lower than V1' and increases in accordance with the engine rotational speed from V1' up to a certain rotational speed, and becomes constant at or above the rotational speed.

FIGS. 8A and 8B show a relationship between engine rotational speed and required oil pressure when the engine 2 is in a specific operation state or, more specifically, when oil temperature of the oil supply path 50 as detected by the oil temperature sensor 73 is equal to or higher than a reference upper limit temperature Tlim set in advance. The required oil pressure shown in FIGS. 8A and 8B differs from required oil pressure of hydraulic operating sections such as the VVTs 32 and 33 and is required oil pressure mainly obtained from the perspective of oil cooling. In other words, when oil is in a high temperature state over a long period of time, properties of the oil changes (deteriorates) and may cause galling of sliding sections and the like. In order to prevent such an occurrence in advance, the oil must be cooled, which is accomplished in a simple and rational manner by increasing the oil discharge amount of the oil pump 36 and increasing a flow rate of oil that passes through the oil cooler 38. FIGS. 8A and 8B show a relationship between an oil flow rate that is effective in terms of oil cooling or, in other words, required oil pressure for oil cooling (hereinafter, referred to as oil cooling required oil pressure, which corresponds to the maximum oil pressure according to the present invention) and engine rotational speed. Moreover, the reference upper limit temperature Tlim is an oil temperature at which there is a risk that properties of oil may change (deteriorate) when the oil is continuously used over a long period of time and is an empirically obtained temperature.

As shown in FIG. 8A, during a low-load operation of the engine 2, the oil cooling required oil pressure is higher than all of the VVT required oil pressure, the valve stop required oil pressure, and the metal required oil pressure for each operation state of the engine 2. In addition, the oil cooling required oil pressure increases as the engine rotational speed increases and becomes approximately constant at or above a specific engine rotational speed (a speed between V2 and V3 described earlier).

On the other hand, as shown in FIG. 8B, during a high-load operation of the engine 2, the oil cooling required oil pressure is higher than all of the VVT required oil pressure, the metal required oil pressure, and the oil jet required oil pressure corresponding to operation states of the engine 2, and the oil cooling required oil pressure increases at a constant rate as the engine rotational speed increases and becomes approximately constant at or above a prescribed engine rotational speed that is higher than an engine rotational speed (V2') at which the required oil pressure of the oil jet 28 is constant.

As described above, the oil cooling required oil pressure is higher than any required oil pressure of the hydraulic operating sections. Accordingly, a flow rate passing through the oil cooler 38 can be increased to facilitate oil cooling without interfering with operations of the hydraulic operating sections such as the VVTs 32 and 33.

Moreover, while the oil cooling required oil pressure during a low-load operation of the engine 2 is approximately consistent with the valve stop required oil pressure in a prescribed engine rotational speed range (V1 to V2) and the oil cooling required oil pressure during a high-load operation of the engine 2 is approximately consistent with the required oil pressure of the oil jet 28 in a prescribed engine rotational speed range (V1' to V2') in the present embodiment, alternatively, the oil cooling required oil pressure may be set higher than other required oil pressure in these engine rotational speed ranges as well.

In the present embodiment, for each operation state of the engine 2, an oil pressure control map in which tentative target oil pressure of the operation state is set based on highest required oil pressure of the required oil pressure of the VVTs 32 and 33, the oil supply sections 41 and 42 of the metal bearings, and the required oil pressure of the oil jet 28 is stored in the storage section of the controller 100. The controller 100 reads tentative target oil pressure in accordance with an operation state of the engine 2 from the oil pressure control map and sets whichever oil pressure is higher between the read tentative target oil pressure and the required oil pressure of the valve stopping mechanism 25b as the target oil pressure. In addition, the storage section of the controller 100 stores an oil pressure control map in which tentative target oil pressure of each operation state of the engine 2 is set based on the oil cooling required oil pressure of the operation state. When oil temperature of the oil supply path 50 as detected by the oil temperature sensor 73 is equal to or higher than the reference upper limit temperature Tlim set in advance, the controller 100 reads the tentative target oil pressure in accordance with an operation state of the engine 2 from the oil pressure control map and sets whichever oil pressure is higher between the read tentative target oil pressure and the required oil pressure of the valve stopping mechanism 25b as the target oil pressure. In this case, since the tentative target oil pressure read from the oil pressure control map is higher than or equal to the required oil pressure of the valve stopping mechanism 25b, the tentative target oil pressure read from the oil pressure control map is adopted as-is as the target oil pressure. Furthermore, the controller 100 performs oil pressure feedback control in which a discharge amount of the oil pump 36 is controlled so that oil pressure (actual oil pressure) detected by the oil pressure sensor 70 equals the target oil pressure.

Next, oil pressure control maps will be described with reference to FIGS. 9A to 10B. While the required oil pressure shown in FIGS. 7A to 8B uses engine rotational speed as a parameter, the oil pressure control maps shown in FIGS. 9A to 10B further use engine load and oil temperature as parameters to provide a three-dimensional graph representation of tentative target oil pressure.

Figure 9A:
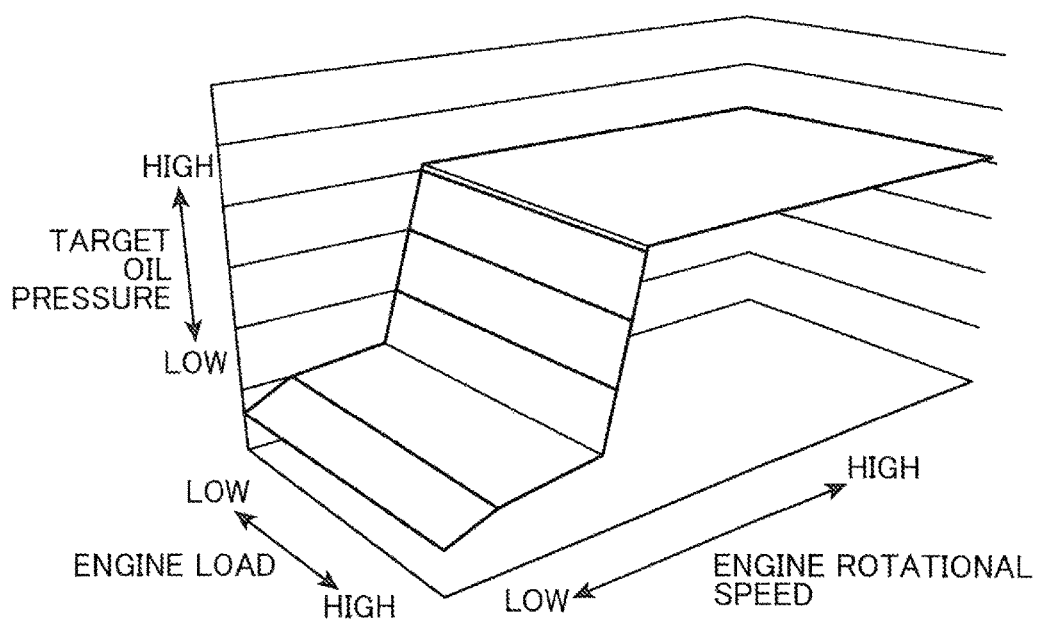
Figure 9B:
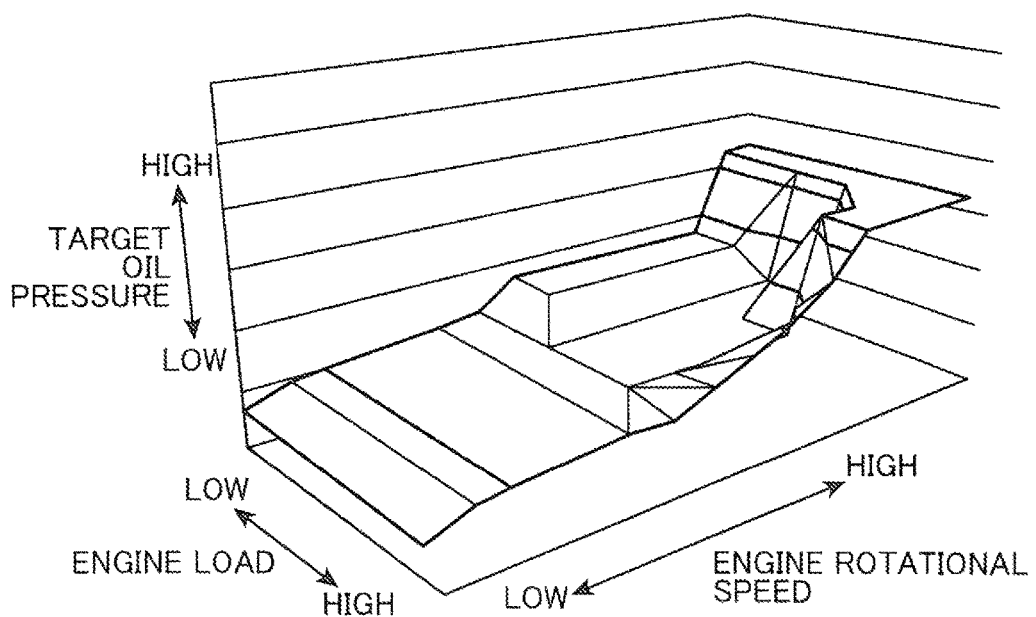
Figure 10A:
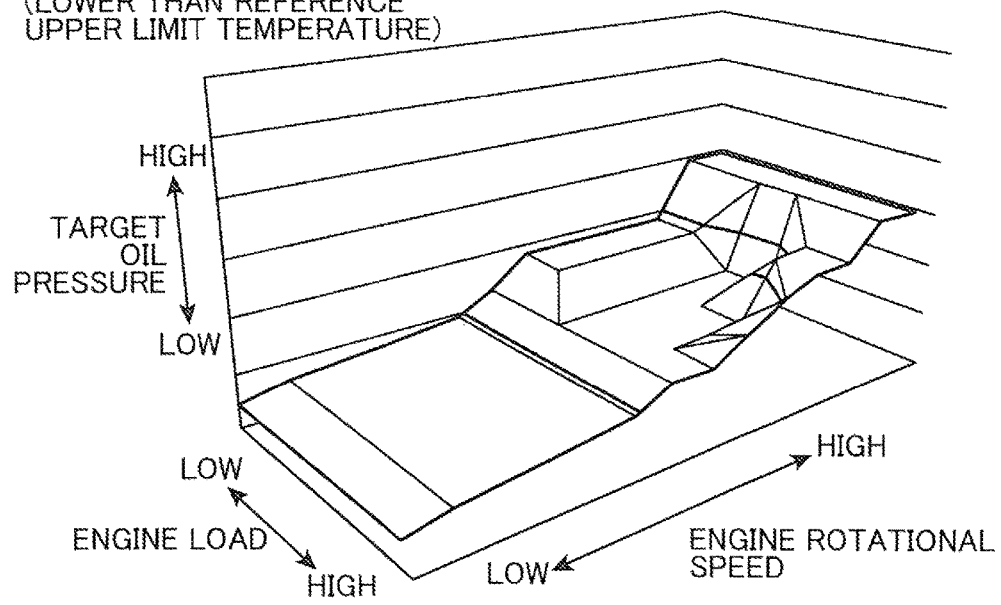
Figure 10B:
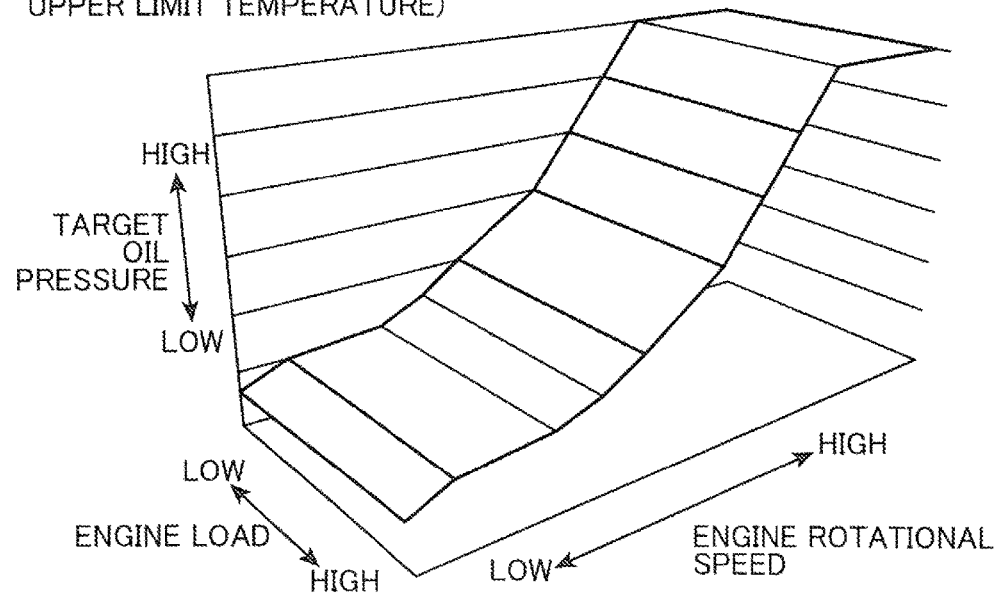

In other words, the oil pressure control maps in FIGS. 9A, 9B and 10A set, for each operation state of the engine 2, tentative target oil pressure of the operation state based on highest required oil pressure of the required oil pressure of the VVTs 32 and 33, the oil supply sections 41 and 42 of the metal bearings, and the required oil pressure of the oil jet 28, and the oil pressure control map in FIG. 10B sets, for each operation state of the engine 2, tentative target oil pressure of the operation state based on oil cooling required oil pressure.

In this case, FIGS. 9A and 9B respectively show oil pressure control maps during a cold period and a warm period of the engine 2 (oil temperature), and FIGS. 10A and 10B respectively show oil pressure control maps during a high temperature period of the engine 2 (oil temperature), or more specifically, FIG. 10A shows an oil pressure control map when the engine 2 (oil temperature) is lower than the reference upper limit temperature Tlim and FIG. 10B shows an oil pressure control map when the engine 2 (oil temperature) is equal to or higher than the reference upper limit temperature Tlim. The controller 100 uses these oil pressure control maps in a discriminating manner in accordance with the oil temperature detected by the oil temperature sensor 73. Specifically, when the engine 2 is in a cold state after start-up, the controller 100 reads tentative target oil pressure in accordance with an operation state (an engine rotational speed and/or an engine load) of the engine 2 based on the cold-period oil pressure control map shown in FIG. 9A. When the engine 2 warms up and oil equals or exceeds a prescribed oil temperature (<Tlim), the controller 100 reads tentative target oil pressure based on the warm-period oil pressure control map shown in FIG. 9B or the high temperature-period oil pressure control map shown in FIG. 10A. In addition, in an operation state of the engine 2 in which the temperature is high and the oil temperature exceeds the reference upper limit temperature Tlim, the controller 100 reads tentative target oil pressure based on the oil pressure control map shown in FIG. 10B.

When the target oil pressure is set, the controller 100 converts the target oil pressure into an oil flow rate (a discharge amount) and obtains a target flow rate (a target discharge amount). In addition, using a duty ratio map similar to the characteristics of the oil pump 36 shown in FIG. 5, the controller 100 sets a duty ratio for driving the linear solenoid valve 49 based on a target flow rate calculated by correcting the obtained target flow rate as will be described below and the engine rotational speed, transmits a control signal of the set duty ratio to the linear solenoid valve 49, and controls the discharge amount of the oil pump 36.

FIG. 11 is a block diagram showing a configuration of discharge amount control of the oil pump 36 by the controller 100.

As shown in FIG. 11, the controller 100 reads tentative target oil pressure using the oil pressure control maps described above based on the engine rotational speed, the engine load, and the oil temperature detected by the various sensors, and sets whichever is the higher oil pressure between the tentative target oil pressure and the valve stop required oil pressure as the target oil pressure. Since the target oil pressure is target oil pressure at a position of the oil pressure sensor 70, the target oil pressure is revised in consideration of an allowance for oil pressure reduction (to be measured in advance) from the oil pump 36 to the oil pressure sensor 70 (the target oil pressure is increased by an amount corresponding to the allowance for oil pressure reduction) to calculate revised target oil pressure. The revised target oil pressure is converted into a flow rate (a discharge amount) of the oil pump 36 to obtain a target flow rate (a target discharge amount).

Meanwhile, the controller 100 converts a predicted operation amount (calculated from a difference between a present operating angle and a target operating angle and from an engine rotational speed) of the intake-side VVT 32 when operating the intake-side VVT 32 into a flow rate to obtain a consumed flow rate during operation of the intake-side VVT 32, and similarly converts a predicted operation amount of the exhaust-side VVT 33 when operating the exhaust-side VVT 33 into a flow rate to obtain a consumed flow rate during operation of the exhaust-side VVT 33. Both of the consumed flow rates are added to the target flow rate to correct the target flow rate.

In addition, the controller 100 converts a predicted operation amount of the valve stopping mechanism 25b (a predicted operation amount of the lock pin 252) when operating the valve stopping mechanism 25b to perform valve stopping to obtain a consumed flow rate during operation of the valve stopping mechanism 25b. Since the predicted operation amount of the lock pin 252 is constant, the consumed flow rate during operation of the valve stopping mechanism 25b is also constant. The consumed flow rate during operation of the valve stopping mechanism 25b is also added to the target flow rate to correct the target flow rate.

During a steady operation of the engine 2, since the predicted operation amounts of the VVTs 32 and 33 and the valve stopping mechanism 25b are 0, a correction of the target flow rate based on these predicted operation amounts is not performed. In contrast, during a transient operation of the engine 2, a correction of the target flow rate based on the predicted operation amounts of the VVTs 32 and 33 and the valve stopping mechanism 25b is performed or, in other words, correction control of the discharge amount of the oil pump 36 is performed.

Furthermore, the target flow rate corrected in accordance with the predicted operation amounts is further corrected by an oil pressure feedback amount. In the present embodiment, the oil pressure feedback amount is an oil pressure feedback amount in accordance with a deviation between predicted oil pressure which predicts how oil pressure (actual oil pressure) as detected by the oil pressure sensor 70 changes with respect to a change in target oil pressure during a transient operation of the engine 2 and the detected actual oil pressure. When the actual oil pressure is higher than the predicted oil pressure, the oil pressure feedback amount assumes a negative value and the target flow rate is reduced. On the other hand, when the actual oil pressure is lower than the predicted oil pressure, the oil pressure feedback amount assumes a positive value and the target flow rate is increased. When the actual oil pressure is equal to the predicted oil pressure, the oil pressure feedback amount is 0 (a correction based on the oil pressure feedback amount is not performed). In this case, predicted oil pressure is obtained in consideration of a response delay of the oil pump 36 itself when the target oil pressure changes in steps, a response delay until the oil pressure reaches the oil pressure sensor 70 from the oil pump 36, and the like.

Based on the target flow rate corrected as described above (described as "corrected target flow rate" in FIG. 11) and the engine rotational speed, the controller 100 sets a duty ratio using a duty ratio map (not shown) stored in advance and transmits a control signal of the set duty ratio to the linear solenoid valve 49. Accordingly, the oil discharge amount of the oil pump 36 is controlled.

<Operational Advantage of the Oil Supply Apparatus 1>

According to the oil supply apparatus 1 described above, in normal operation states of the engine 2 in which oil temperature is lower than the reference upper limit temperature Tlim, highest required oil pressure of required oil pressure of the hydraulic operating sections such as the VVTs 32 and 33, the valve stopping mechanism 25b, the oil jet 28, the oil supply sections 41 and 42 of the metal bearings of the journal or the like of the crank shaft 9, and the like is set as target oil pressure for each operation state of the engine 2, and feedback control of the discharge amount of the oil pump 36 is performed so that oil pressure (actual oil pressure) as detected by the oil pressure sensor 70 equals the target oil pressure. Therefore, a drive load on the oil pump 36 can be kept at a necessary minimum while appropriately securing operating oil pressure (required oil pressure) of the respective hydraulic operating sections and, accordingly, fuel efficiency can be improved.

In addition, according to the oil supply apparatus 1, when the oil temperature in the oil supply path 50 as detected by the oil temperature sensor 73 equals or exceeds the reference upper limit temperature Tlim, as described earlier, oil cooling required oil pressure that exceeds the highest required oil pressure among the required oil pressure required from the hydraulic operating sections in accordance with the operation state of the engine 2 is set as the target oil pressure and a discharge amount from the oil pump 36 is controlled based on the target oil pressure. In other words, the oil discharge amount by the oil pump 36 is increased in excess of a discharge amount corresponding to the required oil pressure of the hydraulic operating sections and, accordingly, the increase in the flow rate of oil passing through the oil cooler 38 facilitates cooling of the oil. Therefore, a temperature rise of oil can be effectively suppressed and, by extension, galling of a sliding section and the like attributable to deterioration of oil can be prevented in a sophisticated manner with a simple and rational configuration that utilizes the existing oil cooler 38.

Moreover, in this case, since the oil cooling required oil pressure is assumed to be oil pressure that exceeds highest required oil pressure of the required oil pressure of the hydraulic operating sections corresponding to the operation state of the engine 2 as described above (refer to FIGS. 8A and 8B), a temperature rise of oil can be suppressed without interfering with operations of the hydraulic operating sections such as the VVTs 32 and 33.

(Second Embodiment)

Hereinafter, a second embodiment of the present invention will be described with reference to the drawings.

Figure 12:
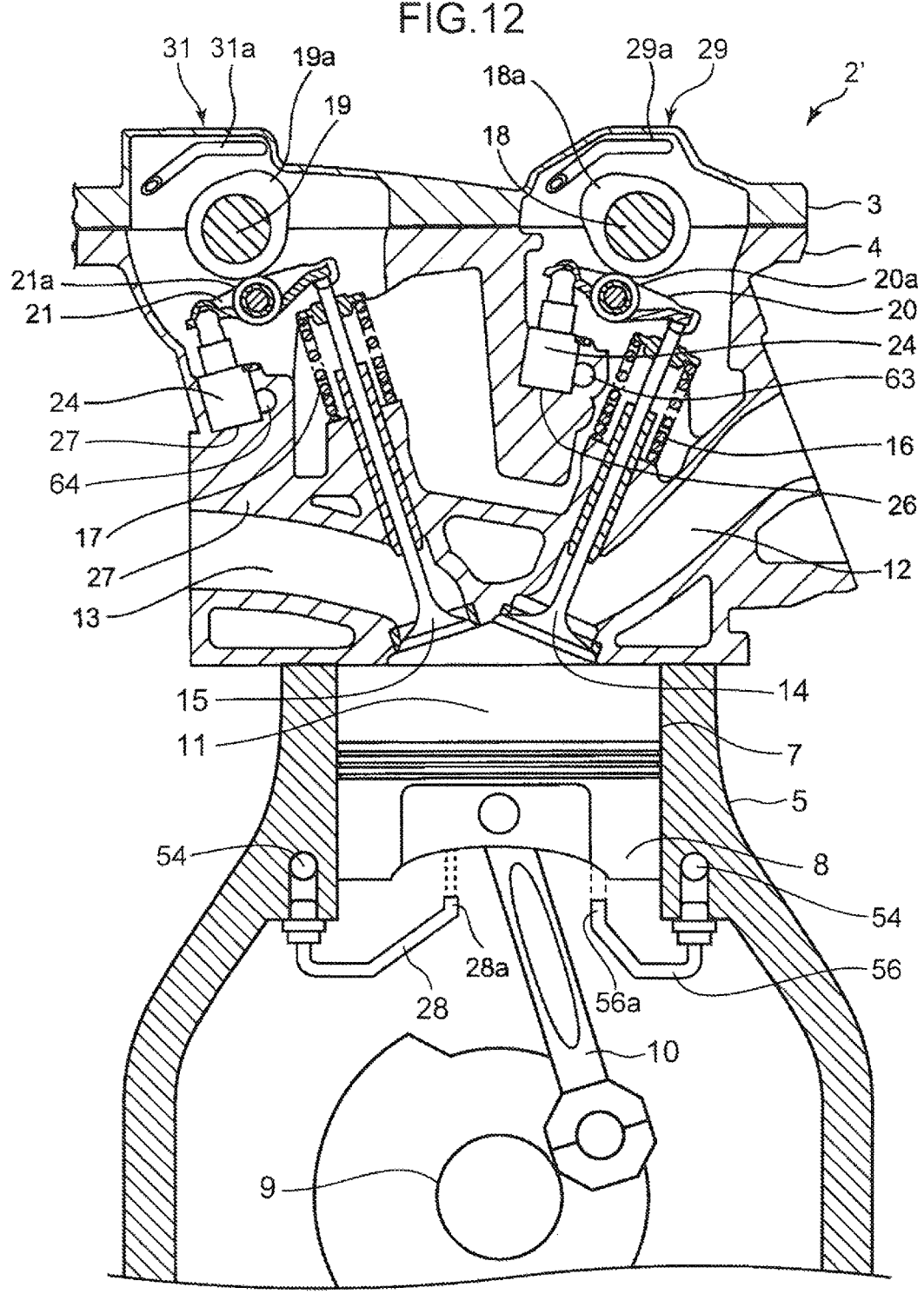
FIG. 12 is a sectional view showing a schematic configuration of a multi-cylinder engine to which an oil supply apparatus according to the present invention is applied (a second embodiment).
Figure 13:
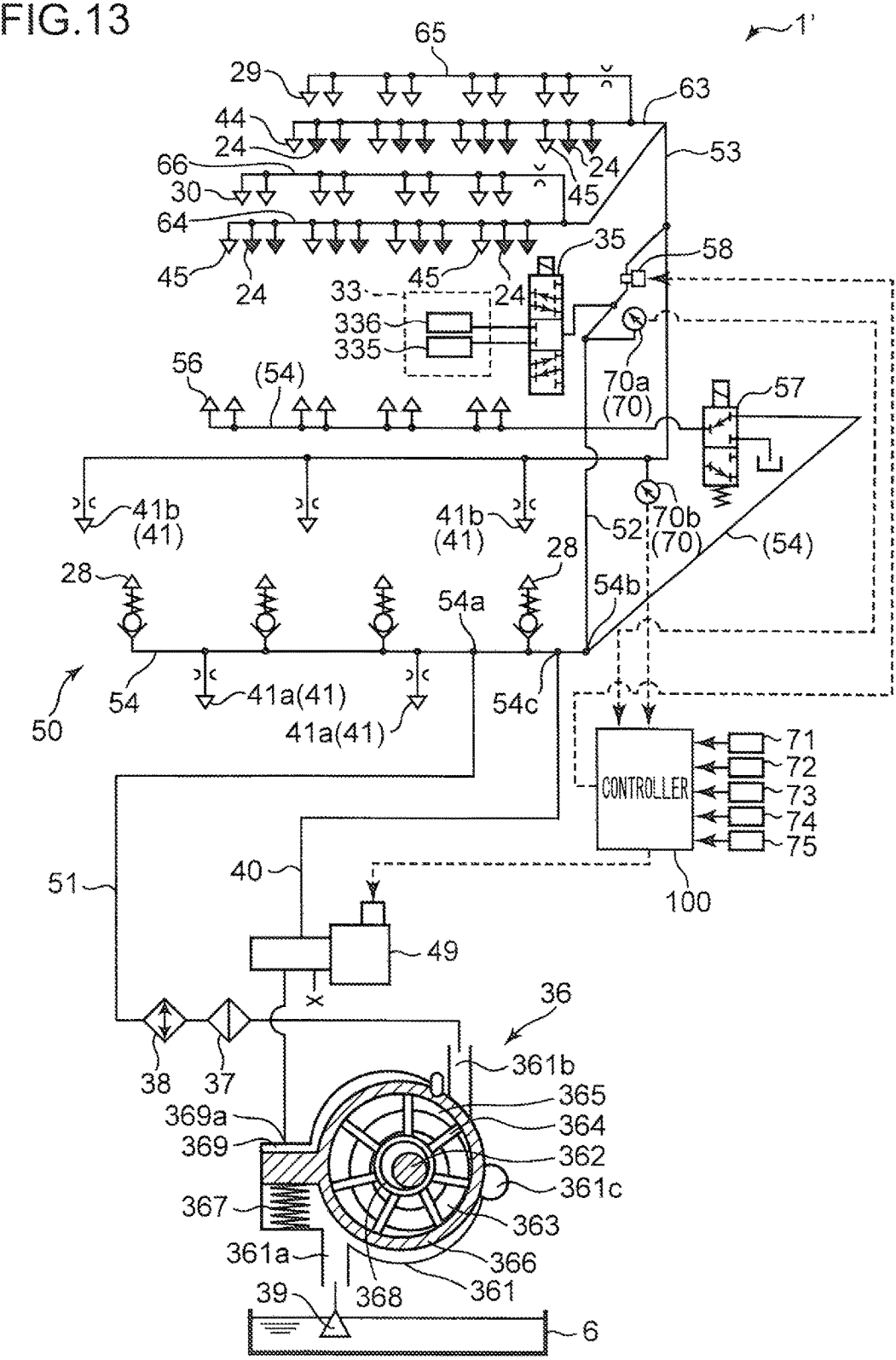
FIG. 13 is a diagram showing a schematic configuration of an oil supply apparatus (the second embodiment).

FIG. 12 shows an engine 2' according to the second embodiment, and FIG. 13 shows an oil supply apparatus 1' that is applied to the engine 2'. Moreover, since the engine 2' and the oil supply apparatus 1' according to the second embodiment share configurations with the first embodiment, differences from the first embodiment will be described in detail below.

<Configuration of Engine>

The engine 2' according to the second embodiment shown in FIG. 12 does not include the valve stopping mechanism 25b. In other words, in the engine 2', the HLA 24 without a valve stopping mechanism is provided as a pivot mechanism of the respective swing arms 20 and 21 for all cylinders.

In addition, in the cylinder block 5 of the engine 2', the main gallery 54 which extends in the cylinder array direction is provided inside an intake-side side wall of the cylinder bore 7. An oil jet 56 for piston lubrication which communicates with the main gallery 54 is provided at a position which is in a vicinity of a lower side of the main gallery 54 and which corresponds to each piston 8. The oil jet 56 has a nozzle 56a that is positioned on a lower side of the piston 8 and is configured to inject oil (lubricating oil) at a narrower angle than the oil jet 28 for piston cooling mainly toward a rear surface of a skirt section of the piston 8 from the nozzle 56a. A passage for guiding oil is formed on the skirt section of the piston 8 and oil injected from the nozzle 56a is guided to a piston sliding surface through the passage.

In addition, among the VVTs 32 and 33, the exhaust-side VVT 33 is a hydraulic VVT which changes valve characteristics by a hydraulic operation in a similar manner to the first embodiment, but the intake-side VVT 32 is an electric VVT which changes valve characteristics by an electric operation or, more specifically, an operation of an electric motor. Different operational systems are adopted between the intake side and the exhaust side in this manner because, on the intake side, control of valve characteristics is often required immediately after start of the engine 2' and, accordingly, an electric system is more advantageous. In other words, while relatively high oil pressure is required to operate the hydraulic VVT, it is difficult to secure sufficient operating oil pressure and promptly control valve characteristics in an operation range immediately after the start of the engine where engine revolution and oil temperature are both low.

<Description of Oil Supply Apparatus 1'>

As shown in FIG. 13, in the oil supply apparatus 1' according to the second embodiment, the oil jet 56 for piston lubrication and an on-off valve 57 which turns on/off the oil injection by the oil jet 56 are connected to the main gallery 54. In addition, the VVT 33 (the advanced oil pressure chamber 33b and the retarded oil pressure chamber 335) is connected to the second communicating path 52 via the exhaust-side first direction switching valve 35.

In the second communicating path 52, a variable orifice 58 (corresponding to the oil pressure adjusting apparatus according to the present invention) is provided at a position on a downstream side of a connection position of the exhaust-side first direction switching valve 35. The variable orifice 58 is one of flow rate regulating valves that change a flow rate of oil and adjusts an oil flow rate of the second communicating path 52 under control of the controller 100. In other words, as a result of the oil flow rate of the second communicating path 52 being controlled in this manner, oil pressure of the third communicating path 52 is controlled.

Moreover, although not shown, the crank shaft 9 of the engine 2' supplies oil, which is supplied to the metal bearings of the second and fourth main journals, to the crank pins through an inside passage of the crank shaft 9. Therefore, the oil supply apparatus 1' is not provided with the oil supply section 42 of the metal bearing which is arranged on the crank pin of the crank shaft 9. Instead, oil supply sections 41a of the second and fourth metal bearings which require high oil pressure among the oil supply sections 41 of the metal bearings arranged on the five main journals of the crank shaft 9 are connected to the main gallery 54, and oil supply sections 41b of metal bearings arranged on the other main journals or, in other words, the first, third, and fifth metal bearings with relatively low required oil pressure are connected to the third communicating path 53. Accordingly, appropriate amounts of oil can be supplied to all metal bearings and crank pins of the crank shaft 9 without providing the oil supply 42 that is exclusively used for the crank pins.

In addition, as the oil pressure sensor 70 that detects oil pressure of the oil supply path 50, the oil supply apparatus 1' is provided with a first oil pressure sensor 70a which detects oil pressure of the main gallery 54 or an upstream-side oil path in which oil pressure equals or exceeds that of the main gallery 54 (in the present example, the second communicating path 52) and a second oil pressure sensor 70b which detects oil pressure of a downstream-side oil path of the main gallery 54 (in the present example, the third communicating path 53). In the present example, the main gallery 54 and the second communicating path 52 correspond to the upstream-side oil path according to the present invention and the third communicating path 53 corresponds to the downstream-side oil path according to the present invention. In addition, the second oil pressure sensor 70b corresponds to the oil pressure sensor according to the present invention.

Moreover, since the engine 2' is not provided with the valve stopping mechanism as described above, the oil supply apparatus 1' is not provided with the oil paths 61 and 62, the second direction switching valves 46 and 47, the check valve 48, and the like described in the first embodiment.

Even in the second embodiment, basically in a similar manner to the first embodiment, the controller 100 reads target oil pressure using oil pressure control maps stored in the storage section of the controller 100 in advance for each operation state of the engine 2' based on the engine rotational speed, the engine load, and the oil temperature detected by the various sensors. Furthermore, the controller 100 performs feedback control on the discharge amount of the oil pump 36 so that oil pressure (actual oil pressure) of the oil supply path 50 as detected by the first oil pressure sensor 70a equals the target oil pressure.

In the second embodiment, as described above, the engine 2' is not provided with a valve stopping mechanism and the intake-side VVT 32 is electrically powered. Therefore, although not illustrated, for each operation state of the engine 2', an oil pressure control map in which target oil pressure of the operation state is set based on highest required oil pressure of the required oil pressure of the VVT 32, the oil supply sections 41a (41) of the second and fourth metal bearings of the crank shaft 9, and the required oil pressure of the oil jets 28 and 56 (oil pressure control maps corresponding to FIGS. 9A to 10B) is stored in advance in the storage section of the controller 100. The controller 100 sets target oil pressure in accordance with an operation state of the engine 2' from the oil pressure control maps.

Moreover, in the second embodiment, an oil pressure control map (hereinafter, referred to as a second oil pressure control map) which is defined mainly based on a relationship with hydraulic operating sections connected to downstream-side oil paths 63 to 66 (hereinafter, referred to as sub galleries) including the third communicating path 53 is stored in the controller 100 separately from the oil pressure control map described above (hereinafter, referred to as a first oil pressure control map). Specifically, for each operation state of the engine 2', an oil pressure control map in which target oil pressure of the operation state is set based on highest required oil pressure among the HLA 24, oil supply sections 29 and 30 of the cam sections 18a and 19a of the cam shafts 18 and 19 and the like, oil supply sections 44 and 45 of the metal bearings of the cam shafts 18 and 19, oil supply sections 41b (41) of the first, third, and fifth metal bearings of the crank shaft 9, and the like which are connected to the oil paths 63 to 66 (oil pressure control maps corresponding to FIGS. 9 and 10) is stored in advance in the storage section of the controller 100. The controller 100 sets target oil pressure in accordance with an operation state of the engine 2' from the second oil pressure control map. In addition, the controller 100 performs feedback control on an opening of the variable orifice 58 so that oil pressure (actual oil pressure) of the oil supply path 50 as detected by the second oil pressure sensor 70b equals the target oil pressure obtained from the second oil pressure control map.

In other words, for each operation state of the engine 2', the controller 100 determines target oil pressure (hereinafter, referred to as first target oil pressure) using the first oil pressure control map, and performs feedback control on the discharge amount of the oil pump 36 so that oil pressure (actual oil pressure) of the oil supply path 50 as detected by the first oil pressure sensor 70a equals the first target oil pressure based on a similar configuration to that of discharge amount control shown in FIG. 11. Meanwhile, for each operation state of the engine 2', the controller 100 determines target oil pressure (hereinafter, referred to as second target oil pressure) using the second oil pressure control map, and performs feedback control on the opening of the variable orifice 58 so that oil pressure (actual oil pressure) of the oil supply path 50 as detected by the second oil pressure sensor 70a equals the second target oil pressure.

When the oil temperature of the oil supply path 50 as detected by the oil temperature sensor 73 equals or exceeds the reference upper limit temperature Tlim, the controller 100 sets oil cooling required oil pressure that exceeds the highest required oil pressure among the required oil pressure required from the hydraulic operating sections in accordance with the operation state of the engine 2' as the first target oil pressure based on a first oil pressure control map (an oil pressure control map corresponding to FIG. 10B) and controls a discharge amount from the oil pump 36 based on the first target oil pressure. Moreover, the controller 100 does not store a dedicated map for temperatures equal to or higher than the reference upper limit temperature Tlim corresponding to FIG. 10B as the second oil pressure control map for a high-temperature period. Therefore, during a high-temperature period, the controller 100 sets the second target oil pressure based on one second oil pressure control map (an oil pressure control map corresponding to FIG. 10A) regardless of the reference upper limit temperature Tlim and performs feedback control of the opening of the variable orifice 58 based on the second target oil pressure.

<Operational Advantage of the Oil Supply Apparatus 1'>

With the oil supply apparatus 1' according to the second embodiment, for each operation state of the engine 2', highest required oil pressure of the required oil pressure of the VVT 32, the oil supply sections 41a (41) of the second and fourth metal bearings of the crank shaft 9, and the oil jets 28 and 56 is set as first target oil pressure. In addition, feedback control of the discharge amount of the oil pump 36 is performed so that oil pressure (actual oil pressure) as detected by the first oil pressure sensor 70a provided in the second communicating path 52 equals the first target oil pressure. Therefore, a drive load on the oil pump 36 can be kept at a necessary minimum and fuel efficiency can be improved while appropriately securing operating oil pressure (required oil pressure) of the respective hydraulic operating sections.

Furthermore, according to the oil supply apparatus 1', for each operation state of the engine 2', highest required oil pressure among the HLA 24, oil supply sections 29 and 30 of the cam sections 18a and 19a of the cam shafts 18 and 19 and the like, oil supply sections 44 and 45 of the metal bearings of the cam shafts 18 and 19, oil supply sections 41b (41) of the first, third, and fifth metal bearings of the crank shaft 9, and the like is set as second target oil pressure. In addition, feedback control of the opening of the variable orifice 58 is performed so that oil pressure (actual oil pressure) as detected by the second oil pressure sensor 70b provided in the third communicating path 53 equals the second target oil pressure. Therefore, a significant fluctuation in oil pressure of the sub galleries (the downstream-side oil paths 63 to 66 including the third communicating path 53) caused by a fluctuation in oil pressure of the main gallery 54 due to operations of the oil jets 28 and 56 and the like is suppressed.

As a result, with the oil supply apparatus 1' according to the second embodiment, oil in a necessary amount and necessary oil pressure can be supplied in a more reliable and stable manner to all hydraulic operating sections connected to the oil supply path 50 while suppressing drive loss of the oil pump 36.

Moreover, when the oil temperature of the oil supply path 50 as detected by the oil temperature sensor 73 equals or exceeds the reference upper limit temperature Tlim, oil cooling required oil pressure that exceeds the highest required oil pressure of the required oil pressure of the hydraulic operating sections corresponding to the operation state of the engine 2' is set as the first target oil pressure and a discharge amount from the oil pump 36 is controlled based on the first target oil pressure. Therefore, even in the second embodiment, a flow rate of the oil cooler 38 can be increased to suppress a temperature rise of oil in an operation state of the engine 2' in which oil temperature equals or exceeds the reference upper limit temperature Tlim in a similar manner to the first embodiment.

In this case, the second embodiment has an advantage in that, since the variable orifice 58 is controlled based on the second target oil pressure as described above, respective hydraulic operating sections connected to the sub galleries (the downstream-side oil paths 63 to 66 including the third communicating path 53) can be appropriately operated even when increasing a flow rate of oil that passes through the oil cooler 38. In other words, since oil pressure of the entire oil supply path 50 increases as the oil discharge amount of the oil pump 36 increases, an operation failure may conceivably occur due to the rise in oil pressure at hydraulic operating sections with relatively low required oil pressure such as the hydraulic operating sections connected to the sub galleries. However, according to the second embodiment, as described above, since the opening of the variable orifice 58 is controlled based on target oil pressure (second target oil pressure) which is determined based on the second oil pressure control map for a high-temperature period (an oil pressure control map corresponding to FIG. 10A), an excessive rise in the oil pressure of the sub galleries can be suppressed and, accordingly, the respective hydraulic operating section can be properly operated.

<Other Configurations>

The oil supply apparatuses 1 and 1' described above are examples of a preferred embodiment of the engine oil supply apparatus according to the present invention and specific configurations thereof can be modified as appropriate without departing from the gist of the present invention.

Figure 14:
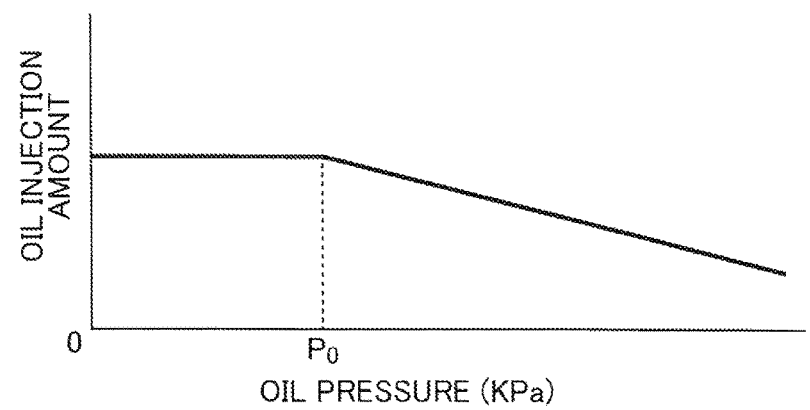
FIG. 14 is a control map for controlling an oil injection amount of an oil jet.

For example, while the oil jet 28 for piston cooling is configured to inject oil when the oil pressure in the main gallery 54 reaches the required oil pressure of the oil jet 28 in the first embodiment (FIG. 4), the oil jet 28 for piston cooling may alternatively be configured to be capable of turning on/off oil injection by controlling an on-off valve in a similar manner to the oil jet 56 for piston lubrication according to the second embodiment. In this case, a configuration may be adopted in which, after enabling an oil injection amount to be controlled by applying a linear solenoid valve as the on-off valve, the oil injection amount from the oil jet 28 is reduced when oil temperature equals or exceeds the reference upper limit temperature Tlim and an oil discharge amount from the oil pump 36 increases or, in other words, when the oil pump 36 is controlled based on the oil pressure control map shown in FIG. 10B. This configuration is more effective in suppressing a temperature rise of oil. In other words, in the case of the configuration according to the first embodiment (FIG. 4), when the oil temperature equals or exceeds the reference upper limit temperature Tlim, the oil discharge amount from the oil pump 36 increases, and oil pressure rises, the oil discharge amount from the oil jet 28 also increases and, accordingly, an amount of heat received by the oil from the pistons increases. However, by adopting a configuration which reduces the oil injection amount from the oil jet 28 as described above, since the amount of heat received by the oil from the pistons can be suppressed by the reduction in the oil injection amount, a temperature rise of oil can be suppressed accordingly. In this case, for example, a configuration can be adopted in which a control map such as that shown in FIG. 14 or, more specifically, a control map defining a relationship between oil injection amount and oil pressure which gradually reduces the oil injection amount when the oil pressure exceeds prescribed oil pressure P0 is stored in the storage section in advance, and the controller 100 controls the solenoid valve based on oil pressure detected by the oil pressure sensor 70. Such a configuration can also be applied to the oil jets 28 and 56 according to the second embodiment.

Moreover, in the first embodiment, the controller 100 senses a state where oil temperature as detected by the oil temperature sensor 73 equals or exceeds the reference upper limit temperature Tlim as the "operation state of the engine where oil enters a prescribed high-oil temperature state", whereby the controller 100 controls the oil pump 36 based on the oil pressure control map shown in FIG. 10B to increase the oil discharge amount. However, the "operation state of the engine where oil enters a prescribed high-oil temperature state" is not necessarily limited to states determined based on the reference upper limit temperature Tlim. For example, in the first embodiment, as shown in FIG. 7B, oil injection by the oil jet 28 is started when an engine rotational speed equals or exceeds V1' in a high-load operation state of the engine. Since an amount of heat received from the pistons increases and oil temperature rises when oil injection by the oil jet 28 is started in this manner, a configuration may be adopted in which a state where the oil jet 28 is operating or, in other words, a state where the engine speed is equal to or higher than V1' is determined to be the "operation state of the engine where oil enters a prescribed high-oil temperature state" and the oil discharge amount by the oil pump 36 is increased. Alternatively, a configuration may be adopted in which a high-load operation state where the engine load is equal to or higher than a prescribed engine load or a high-rotation state where the engine rotational speed is equal to or higher than a prescribed engine rotational speed and the engine load is equal to or higher than a prescribed engine load is determined to be the "operation state of the engine where oil enters a prescribed high-oil temperature state" and the oil discharge amount by the oil pump 36 is increased. With respect to the second embodiment, a configuration may be similarly adopted in which a state where the oil jets 28 and 56 are operating is determined to be the "operation state of the engine where oil enters a prescribed high-oil temperature state" and the oil discharge amount by the oil pump 36 is increased.

In addition, while pumps that are driven by the engines 2 and 2' are applied as the oil pump 36 in the embodiments described above, the oil pump 36 may alternatively be a pump which is driven by an electric motor and which changes an oil discharge amount as a rotational speed of the pump is controlled.

Furthermore, while an example in which the present invention is applied to an in-line four-cylinder gasoline engine is described in the embodiments presented above, the present invention can also be applied to other engines such as a diesel engine.

The present invention described above can be summarized as follows.

An engine oil supply apparatus according to the present invention includes: an oil pump, the discharge amount of which can be controlled; an oil supply path which supplies oil discharged from the oil pump to a hydraulic operating section of an engine; an oil cooler which is provided on the oil supply path and which cools oil discharged from the oil pump; and a control apparatus which sets a required oil pressure required from the hydraulic operating section in accordance with an operation state of the engine, as a target oil pressure, and controls the discharge amount of the oil pump so that an oil pressure inside the oil supply path equals the target oil pressure, wherein the control apparatus controls the oil pump so that, during an operation state of the engine where the oil enters a prescribed high oil temperature state, the oil is discharged in an amount exceeding a discharge amount corresponding to the required oil pressure of the hydraulic operating section in accordance with the operation state of the engine.

According to this oil supply apparatus, a drive load on the oil pump can be kept at a necessary minimum and fuel efficiency can be improved while appropriately securing an oil pressure necessary for the hydraulic operating section. In addition, since oil in an amount exceeding a discharge amount corresponding to the target oil pressure is discharged from the oil pump in an operation state of the engine where the oil enters a prescribed high-oil temperature state, a larger amount of oil passes through the oil cooler in this operation state and, accordingly, cooling of the oil is facilitated. Since an oil cooler is generally provided in an oil supply path in oil supply apparatuses of vehicles and the like, according to the configuration described above, a temperature rise (overheating) of oil can be effectively suppressed with a rational configuration which uses an existing oil cooler.

Moreover, the "hydraulic operating section" described above refers not only to apparatuses which are driven by receiving oil pressure of oil but also to oil supply sections which supply oil using its oil pressure to an object or an object site as lubricating oil or cooling oil.

In the oil supply apparatus described above, preferably, the control apparatus sets, as the target oil pressure, maximum oil pressure which exceeds the required oil pressure of the hydraulic operating section and which is set in advance, in the operation state of the engine where the high-oil temperature state is created.

According to this configuration, the discharge amount of the oil pump can be increased by simple control which only involves setting maximum oil pressure that is set in advance as the target oil pressure.

In addition, in the oil supply apparatus described above, preferably, when the hydraulic operating section is defined as a first hydraulic operating section and when the oil supply path includes an upstream-side oil path which supplies oil discharged from the oil pump to the first hydraulic operating section, and a downstream-side oil path which is connected to the upstream-side oil path and which supplies oil to a second hydraulic operating section whose required oil pressure is lower than that of the first hydraulic operating section, the downstream-side oil path is provided with an oil pressure sensor which detects an oil pressure in the downstream-side oil path and an oil pressure adjusting apparatus capable of adjusting the oil pressure, and when causing the oil pump to discharge oil in an amount exceeding a discharge amount corresponding to the target oil pressure, the control apparatus controls the oil pressure adjusting apparatus so as to adjust the oil pressure of the downstream-side oil path in accordance with a required oil pressure of the first hydraulic operating section.

According to this configuration, the oil pressure in the downstream-side oil path can be appropriately maintained even when the engine operation state where the high-oil temperature state is created is established and thereby the oil discharge amount is increased.

Moreover, preferably, the oil supply apparatus described above further includes an oil temperature sensor which detects an oil temperature in the oil supply path, wherein the control apparatus determines that the engine is in the operation state where the high-oil temperature state is created when the oil temperature detected by the oil temperature sensor is equal to or higher than a prescribed temperature.

According to this configuration, an operation state of the engine where the high-oil temperature state is created can be directly sensed based on the detection of the oil temperature by the oil temperature sensor.

Moreover, preferably, the oil supply apparatus described above further includes an oil supply section which is connected to the oil supply path and which injects oil to a piston when engine revolution is equal to or higher than a prescribed engine revolution, wherein the control apparatus determines that the engine is in the operation state where the high-oil temperature state is created, when a specific operation state having at least one of the prescribed engine revolution or higher and a prescribed engine load or higher is established.

According to this configuration, cooling of the piston is performed as oil is injected to the piston from the oil supply section when the specific operation state having at least one of the prescribed engine revolution or higher and the prescribed engine load or higher is established. In this case, although the oil receives heat from the piston, since the oil discharge amount of the oil pump is increased, a temperature rise of the oil is suppressed.

The invention claimed is:

1. An engine oil supply apparatus comprising:
at least one hydraulic operating section of the engine;
a variable displacement oil pump, the discharge amount of which can be controlled;
an oil supply path, which is connected to the variable displacement oil pump and all of the hydraulic operating sections, and supplies oil discharged from the variable displacement oil pump to all of the hydraulic operating sections;

an oil cooler which is provided between the variable displacement oil pump and the hydraulic operating section on the oil supply path and which cools oil discharged from the variable displacement oil pump; and a controller which is connected to an oil temperature sensor and the variable displacement oil pump, the controller detects an oil temperature from the oil temperature sensor, the controller sets a required oil pressure required from the all of the hydraulic operating section in accordance with an operation state of the engine, as a target oil pressure, and controls the discharge amount of the variable displacement oil pump so that an oil pressure inside the oil supply path equals the target oil pressure, wherein the controller revises the target oil pressure and sets an oil cooling required oil pressure and controls the variable displacement oil pump to perform the oil cooling required oil pressure and to make discharge amount of oil exceed a discharge amount corresponding to the required oil pressure of the hydraulic operating section in accordance with the operation state of the engine, during an operation state of the engine where the oil enters a prescribed high oil temperature state, the oil cooling-required oil pressure makes discharge amount of oil exceed a discharge amount corresponding to the required oil pressure of the hydraulic operating section in accordance with the operation state of the engine, and the oil cooling-required oil pressure is higher than the required oil pressure of all of the hydraulic operating sections.

2. The engine oil supply apparatus according to claim 1, wherein when the at least one hydraulic operating section includes a first hydraulic operating section, the oil supply path includes an upstream-side oil path which supplies oil discharged from the variable displacement oil pump to the first hydraulic operating section, and a downstream-side oil path which is connected to the upstream-side oil path and which supplies oil to a second hydraulic operating section whose required oil pressure is lower than that of the first hydraulic operating section, the downstream-side oil path is provided with an oil pressure sensor which detects an oil pressure in the downstream-side oil path and a variable orifice, and when causing the variable displacement oil pump to discharge oil in an amount exceeding a discharge amount corresponding to the target oil pressure, the controller controls the variable orifice so as to adjust the oil pressure of the downstream-side oil path in accordance with a required oil pressure of the first hydraulic operating section.

3. The engine oil supply apparatus according to claim 1, wherein the oil temperature sensor detects an oil temperature in the oil supply path, and the controller determines that the engine is in the operation state where the high-oil temperature state is created when the oil temperature detected by the oil temperature sensor is equal to or higher than a prescribed temperature.

4. The engine oil supply apparatus according to claim 1, further comprising an oil supplier which is connected to the oil supply path and which injects oil to a piston when a specific operation state having at least one of a prescribed engine revolution or higher and a prescribed engine load or higher is established, wherein the controller determines that the engine is in the operation state where the high-oil temperature state is created, when the specific operation state is established.

* * * * *